(12) United States Patent
Oshiro et al.

(10) Patent No.: US 11,668,254 B2
(45) Date of Patent: Jun. 6, 2023

(54) THROTTLE OPERATING DEVICE

(71) Applicant: ASAHI DENSO CO., LTD., Hamamatsu (JP)

(72) Inventors: Yukio Oshiro, Shizuoka (JP); Keisuke Tsukamoto, Shizuoka (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 0 days.

(21) Appl. No.: 17/541,402

(22) Filed: Dec. 3, 2021

(65) Prior Publication Data
US 2022/0179443 A1    Jun. 9, 2022

(30) Foreign Application Priority Data

Dec. 4, 2020    (JP) .............................. JP2020-201991
Feb. 18, 2021    (JP) .............................. JP2021-024560
Oct. 28, 2021    (JP) .............................. JP2021-176976

(51) Int. Cl.
| | |
|---|---|
| F02D 11/02 | (2006.01) |
| G05G 9/02 | (2006.01) |
| B62K 23/02 | (2006.01) |
| G05G 1/04 | (2006.01) |
| G05G 5/05 | (2006.01) |
| B62K 23/06 | (2006.01) |
| G05G 5/03 | (2008.04) |
| G05G 1/015 | (2008.04) |

(52) U.S. Cl.
CPC .............. *F02D 11/02* (2013.01); *B62K 23/06* (2013.01); *G05G 1/015* (2013.01); *G05G 5/03* (2013.01); *G05G 5/05* (2013.01); *G05G 9/02* (2013.01); *G05G 1/04* (2013.01); *G05G 2505/00* (2013.01)

(58) Field of Classification Search
CPC .. G05G 1/04; G05G 5/03; G05G 5/05; G05G 9/02; G05G 2505/00; B62K 23/06; F02D 11/02
See application file for complete search history.

(56) References Cited

U.S. PATENT DOCUMENTS

| | | | | |
|---|---|---|---|---|
| 8,491,348 | B2 * | 7/2013 | Simard ................. | B62K 23/06 440/87 |
| 10,029,567 | B2 * | 7/2018 | Lefebvre ............... | B62K 23/06 |
| 10,843,764 | B2 * | 11/2020 | Hengst .................. | B62K 11/14 |
| 11,492,984 | B2 * | 11/2022 | Oshiro .................. | B62K 23/06 |
| 2010/0038166 | A1 * | 2/2010 | Chandran ............. | B60K 26/02 180/335 |

(Continued)

FOREIGN PATENT DOCUMENTS

JP    2010-053836 A    3/2010

*Primary Examiner* — Adam D Rogers
(74) *Attorney, Agent, or Firm* — Pearne & Gordon LLP

(57) ABSTRACT

A throttle operating device includes a fixing member, a throttle lever, and a detection sensor. A drive source of the transport is configured to be controlled based on the rotational operation angle of the throttle lever detected by the detection sensor. The throttle lever is configured to be rotated in a forward direction and a reverse direction. When the throttle lever is rotated in the forward direction, the drive source of the transport can be controlled. When the throttle lever is rotated in the reverse direction, a predetermined device mounted on the transport can be operated or an operation of the predetermined device can be stopped.

17 Claims, 38 Drawing Sheets

(56) References Cited

U.S. PATENT DOCUMENTS

| | | | |
|---|---|---|---|
| 2010/0043589 A1* | 2/2010 | Chandran | B62K 11/14 74/504 |
| 2011/0162478 A1* | 7/2011 | Suzuki | G05G 1/04 74/504 |
| 2019/0283834 A1* | 9/2019 | Nishi | B62J 23/00 |
| 2022/0178312 A1* | 6/2022 | Oshiro | F02D 11/02 |
| 2022/0178313 A1* | 6/2022 | Oshiro | F02D 11/02 |
| 2022/0179442 A1* | 6/2022 | Oshiro | G05G 5/03 |

* cited by examiner

THROTTLE OPERATING DEVICE

CROSS-REFERENCE TO RELATED APPLICATIONS

This application is based on and claims priority under 35 USC 119 from Japanese Patent Application No. 2020-201991, filed on Dec. 4, 2020, Japanese Patent Application No. 2021-024560, filed on Feb. 18, 2021, and Japanese Patent Application No. 2021-176976, filed on Oct. 28, 2021.

TECHNICAL FIELD

The present disclosure relates to a throttle operating device capable of controlling a drive source of a transport based on a rotational operation angle of a throttle lever detected by a detection sensor.

BACKGROUND ART

As a throttle operating device of the related art for operating a throttle opening in a vehicle such as an ATV or a four-wheel buggy, a ship such as a PWC (personal watercraft), or a vehicle such as a snow vehicle, for example, as disclosed in JP-A-2010-53836, a device provided with a throttle lever (thumb throttle lever) attached to a vicinity of a grip are mentioned. Such a throttle operating device of the related art is configured so that when a finger of the driver's hand holding the grip is extended to the throttle lever and a rotational operation is performed, a detection sensor can detect a rotational operation angle and control an engine of the transport.

However, in the above-described technique of the related art, the rotational operation of the throttle lever is limited to one direction and it is limited to one which exclusively controls a throttle which controls a drive source. Therefore, the applicant has come to consider that an operation in an opposite direction is allowed and other operations by the throttle lever are also possible.

SUMMARY OF INVENTION

The present disclosure is made in view of such circumstances and an object of the present disclosure is to provide a throttle operating device capable of smoothly performing other operations, in addition to throttle control by rotating a throttle lever.

According to an aspect of the present disclosure, there is provided a throttle operating device including: a fixing member which is fixed to a vicinity of a grip formed at a tip of a handlebar of a transport; a throttle lever which is attached and extending from the fixing member, and the throttle lever configured to be rotated while the grip is gripped; and a detection sensor which is disposed on the fixing member and is configured to detect a rotational operation angle of the throttle lever. A drive source of the transport is configured to be controlled based on the rotational operation angle of the throttle lever detected by the detection sensor. The throttle lever is configured to be rotated in a forward direction and a reverse direction. When the throttle lever is rotated in the forward direction, the drive source of the transport can be controlled. When the throttle lever is rotated in the reverse direction, a predetermined device mounted on the transport can be operated or an operation of the predetermined device can be stopped.

DESCRIPTION OF EMBODIMENTS

Hereinafter, embodiments of the present disclosure will be specifically described with reference to the drawings.

Figure 1:
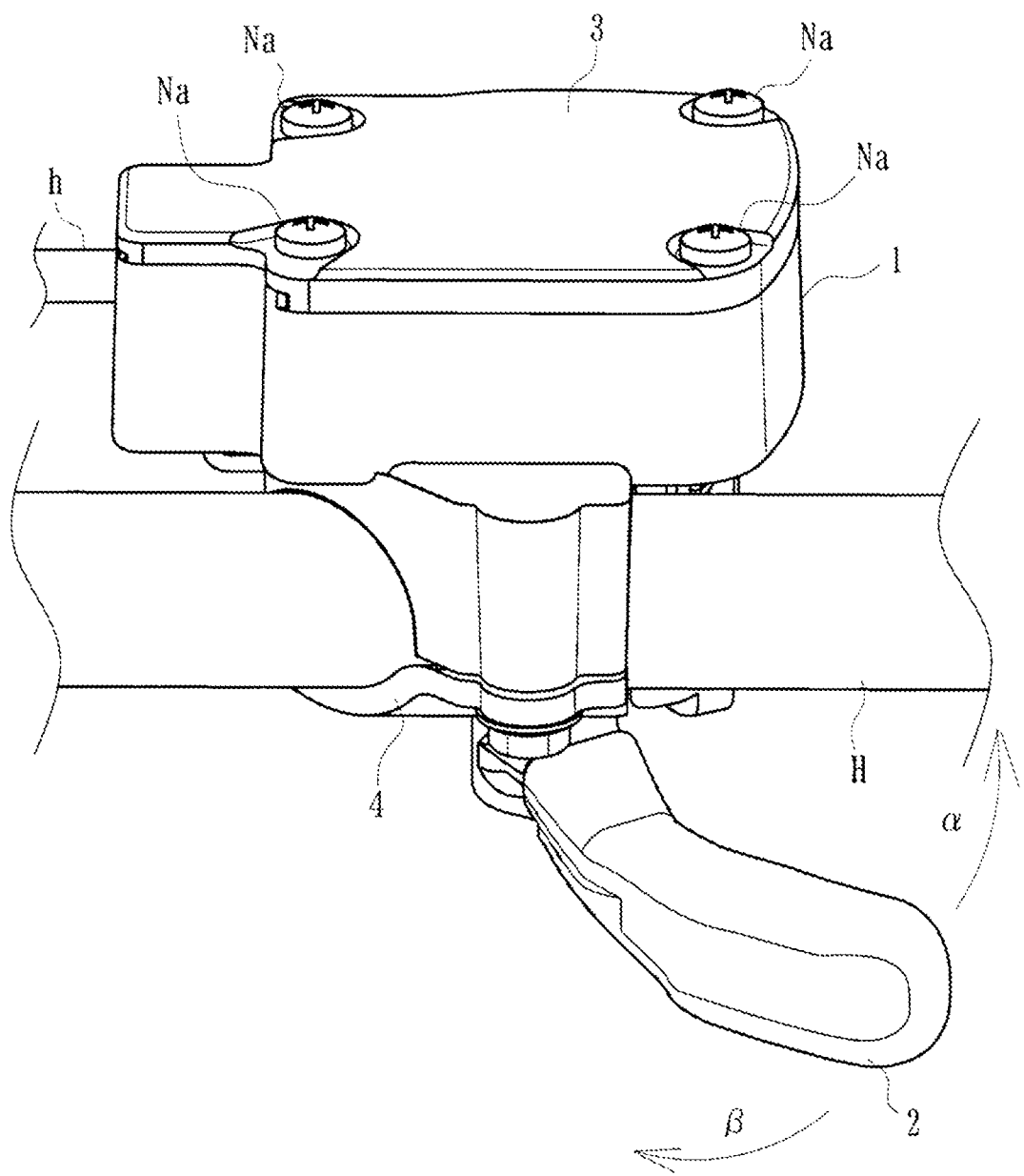
FIG. 1 is an overall perspective view illustrating a throttle operating device according to a first embodiment of the present disclosure.
Figure 2:
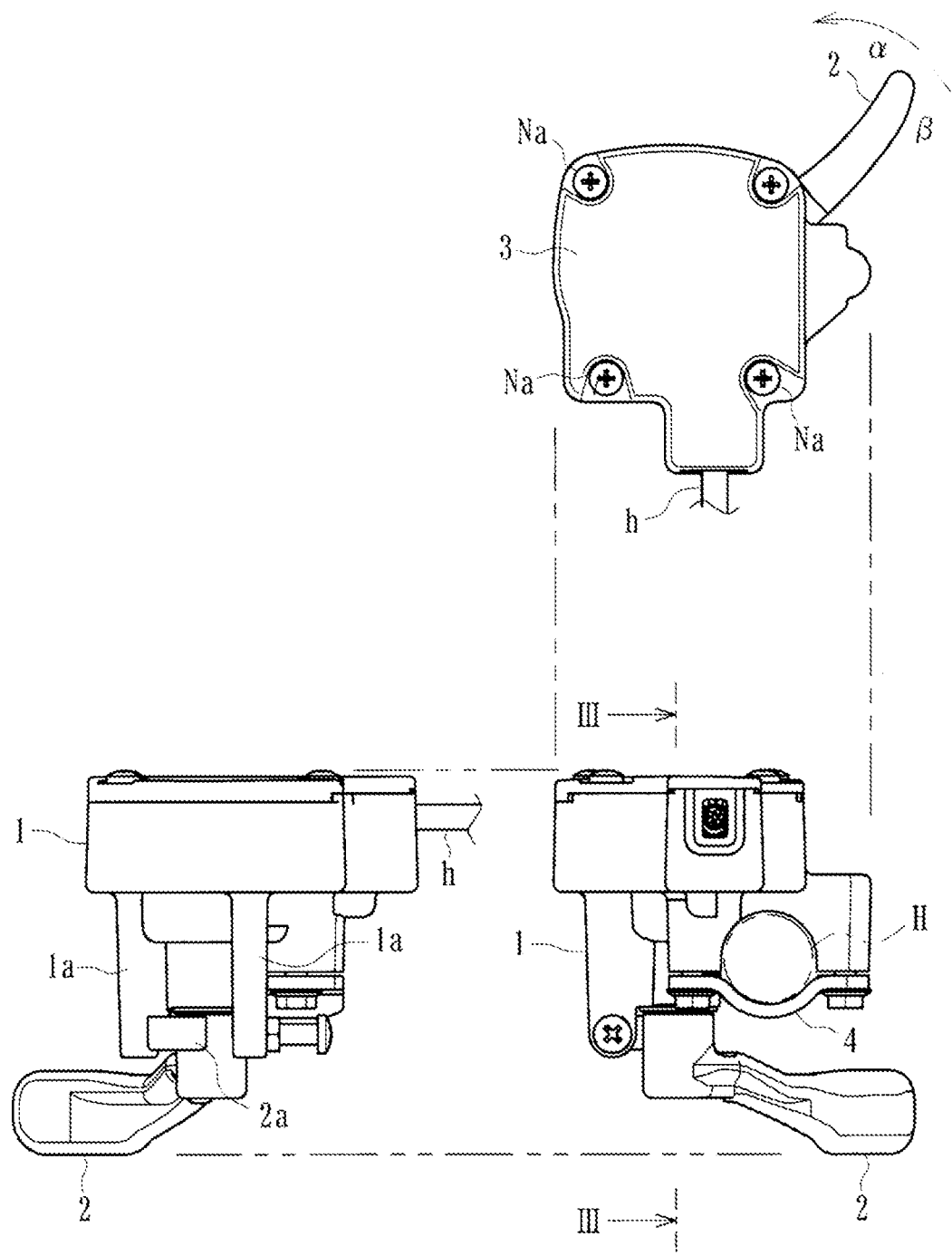
FIG. 2 is a three-view orthographic projection illustrating the throttle operating device.
Figure 3:
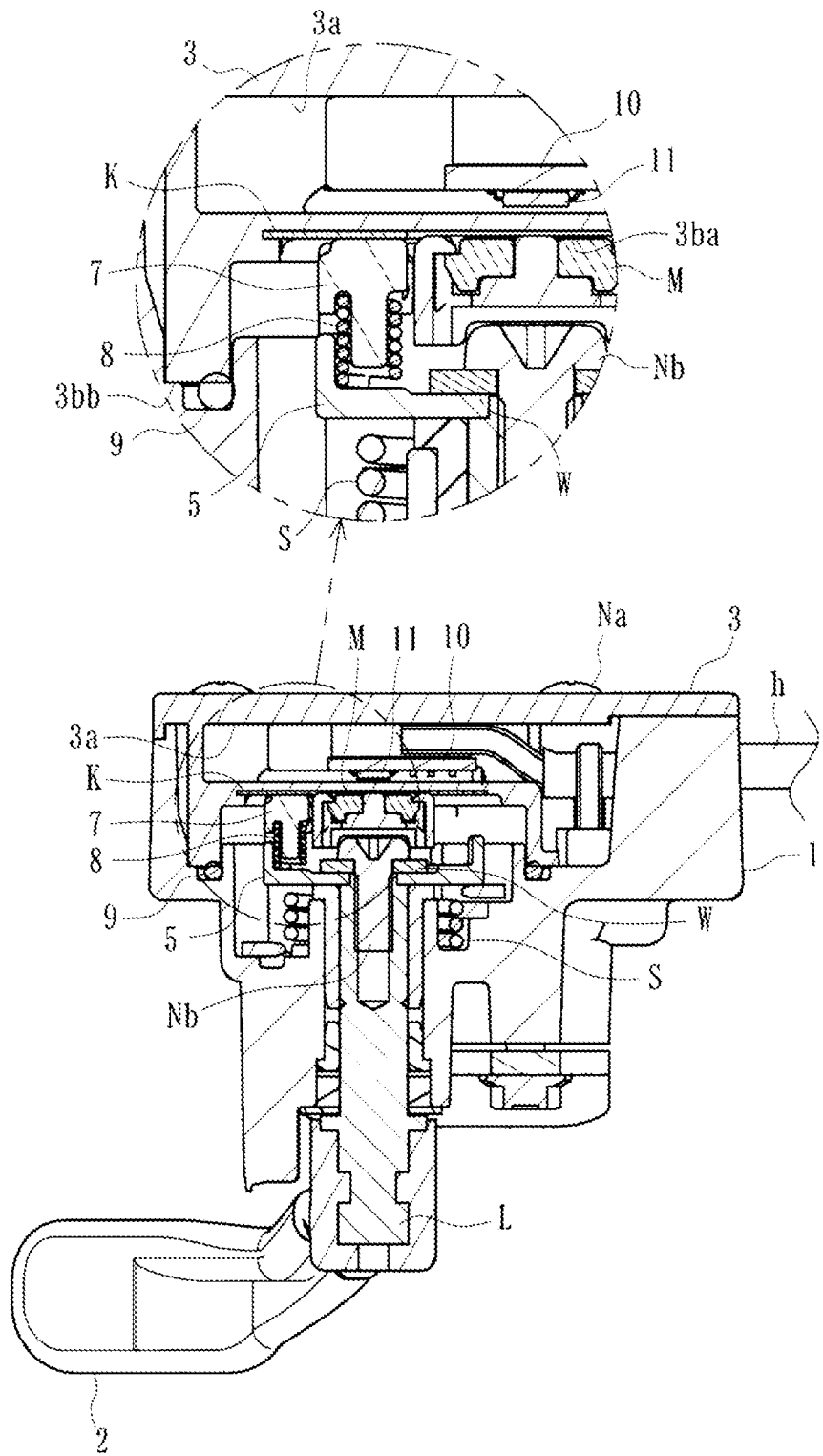
FIG. 3 is a cross-sectional view taken along the line of FIG. 2.

A throttle operating device according to a first embodiment is fixed to a handlebar of a vehicle such as an ATV or a buggy, a ship such as a PWC (personal watercraft), or a vehicle (in the present embodiment, a vehicle such as an ATV or a buggy) such as a snow vehicle so that an engine (drive source) of the vehicle can be controlled. As illustrated in FIGS. 1 to 3, the throttle operating device is configured to include a fixing member 1, a throttle lever 2 which is a so-called thumb lever, a cover member 3, a rotating member 5, a resistance force applying unit 7, a detection sensor 11, a return spring S, and a sliding member K.

Figure 4:
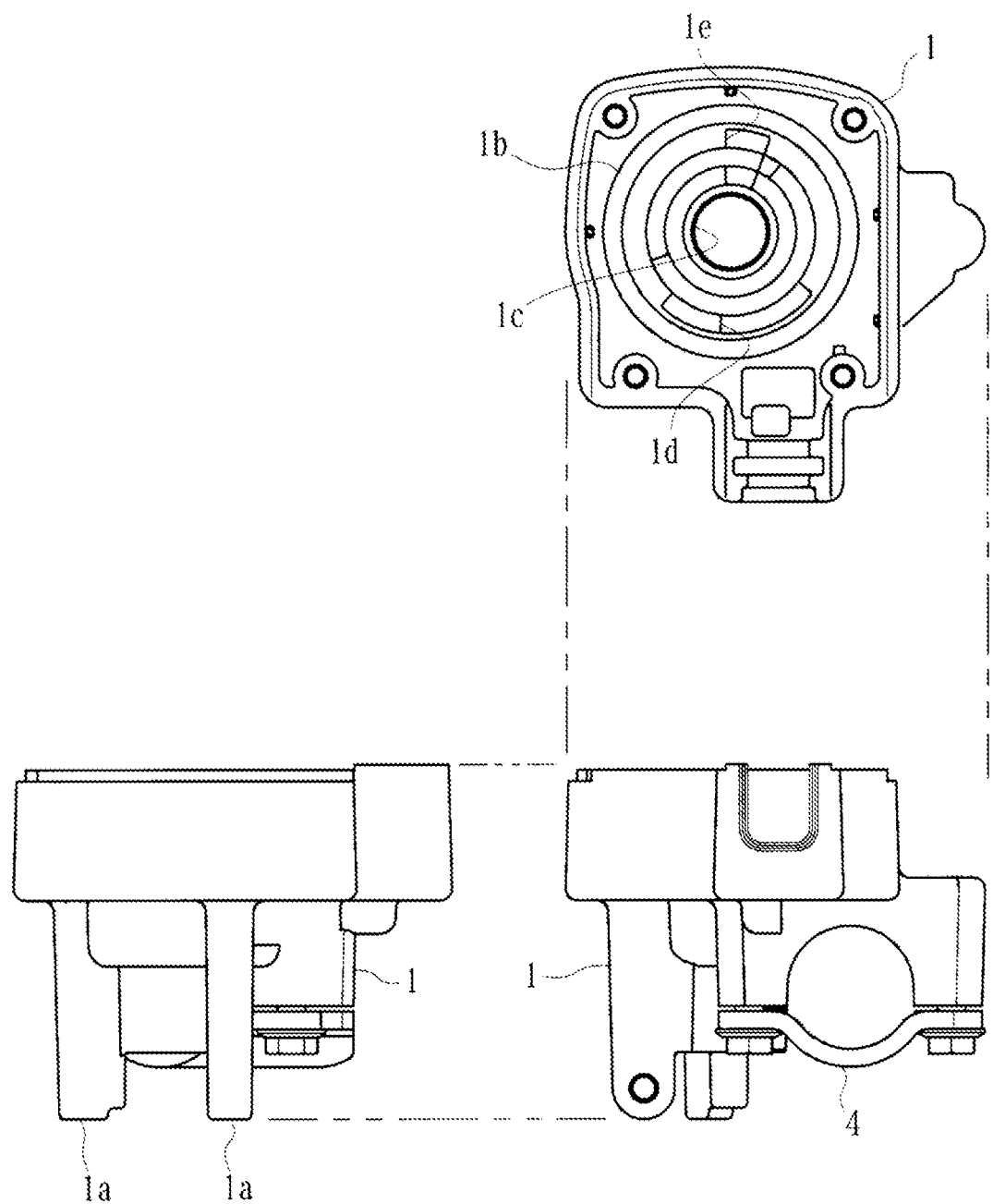
FIG. 4 is a three-view orthographic projection illustrating a fixing member of the throttle operating device.

The fixing member 1 is fixed to a handlebar H to pivotally support the throttle lever 2 and is fixed to a vicinity of a grip formed at a tip of the handlebar H of the vehicle. As illustrated in FIG. 4, the fixing member 1 has an opening at an upper side to form an accommodation recess portion inside and a holding member 4 is attached to the fixing member 1. The fixing member 1 can be fixed by holding the handlebar H with the holding member 4.

Figure 8:
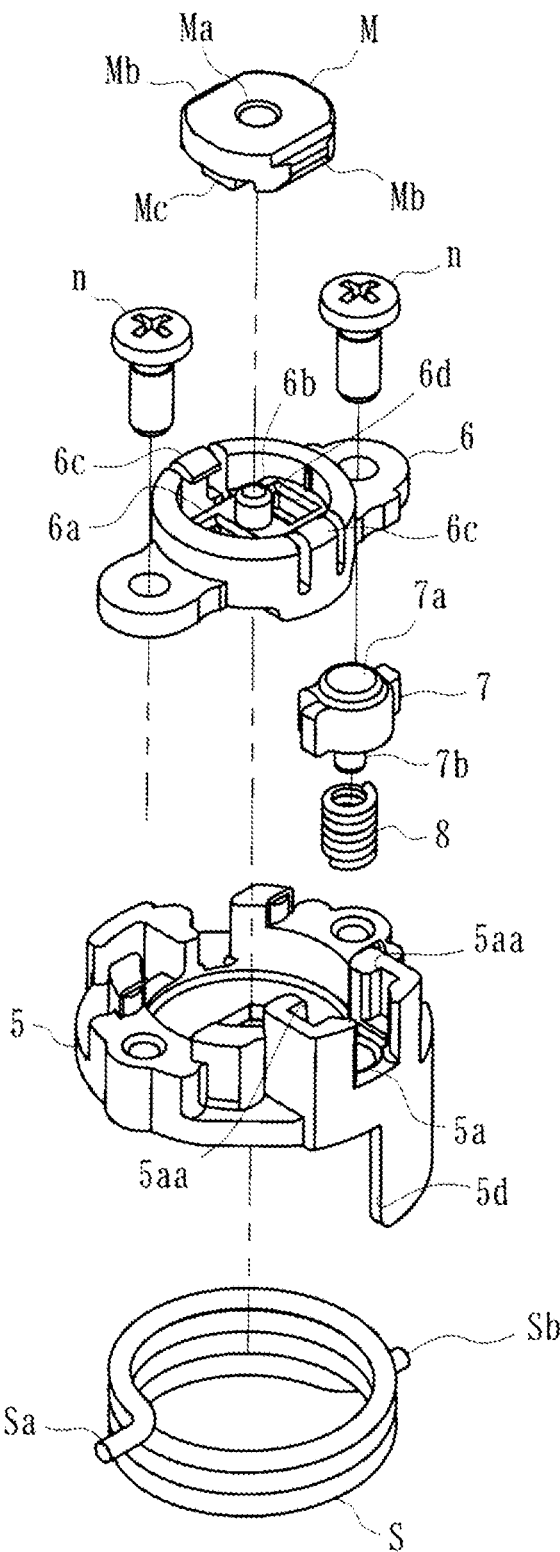
FIG. 8 is an exploded perspective view illustrating an assembled state of the integrated component of the throttle operating device.

Further, the fixing member 1 is formed with a pair of regulating portions 1a-1a formed at a predetermined position on the outside thereof so as to be separated from each other by a predetermined dimension. Further, on a bottom surface of the accommodation recess portion formed inside, a mounting groove 1b for fitting and positioning a sealing member 9 (see FIG. 3), a through hole 1c through which a shaft member L is inserted to allow a rotational operation of the throttle lever 2, a first fixing portion 1d which locks and fixes one end Sa (see FIG. 8) of the return spring S, and a second fixing portion 1e which locks and fixes the other end Sb (see FIG. 8) of the return spring S are formed in the fixing member 1.

Figure 7:
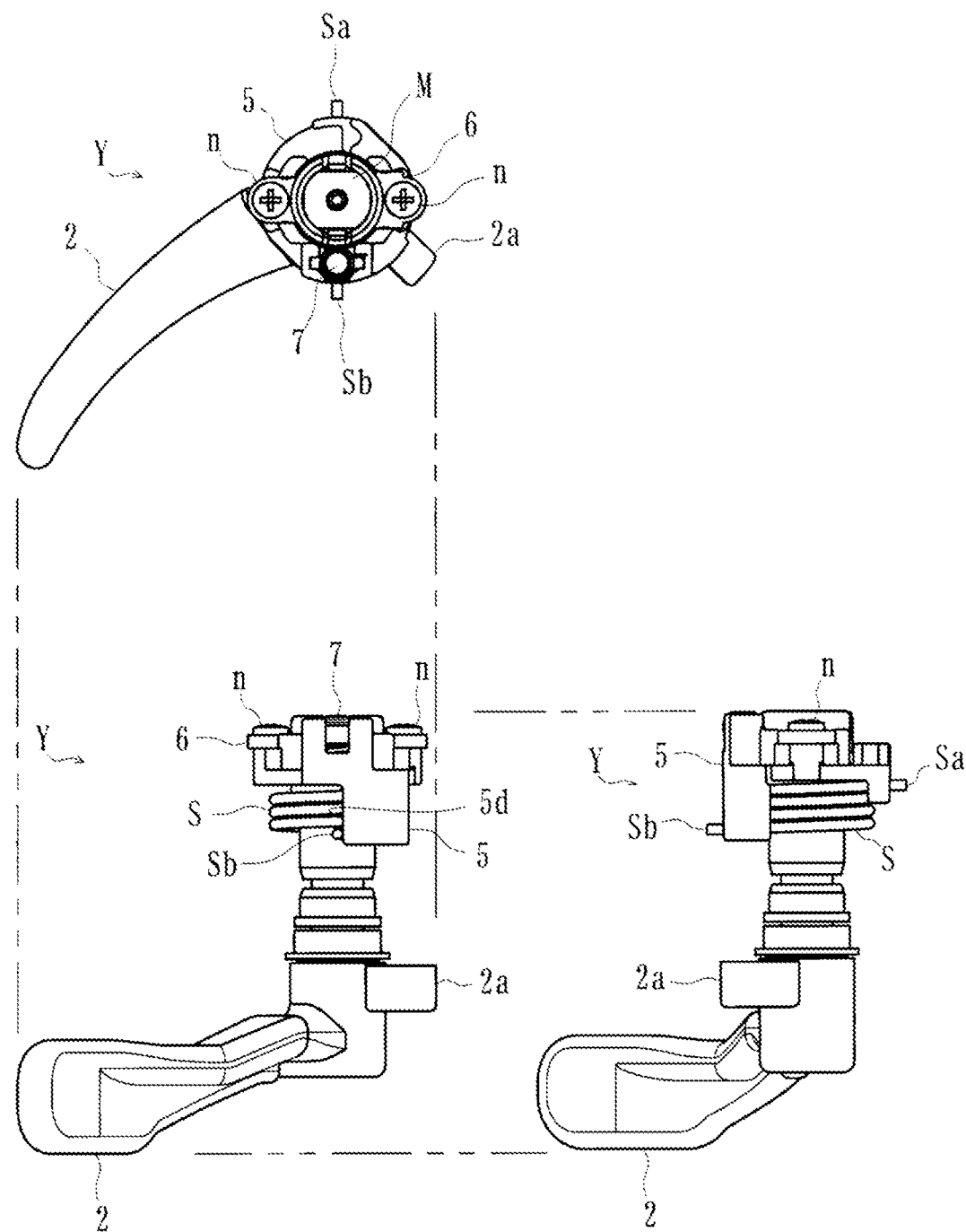
FIG. 7 is a three-view orthographic projection illustrating the throttle lever of the throttle operating device and the integrated component which rotates together with the throttle lever.

The throttle lever 2 is attached and extends from a lower side of the fixing member 1 so that a driver can pivot the throttle lever 2 while gripping the grip of the vehicle. As illustrated in FIG. 3, the throttle lever 2 is connected to the shaft member L. The shaft member L rotates around a shaft in response to the rotational operation of the throttle lever 2 and the rotating member 5 is fixed to a tip portion of the shaft member L by a mounting screw Nb and a washer W. As illustrated in FIG. 7, the throttle lever 2 has a protruding portion 2a protruding laterally. The throttle lever 2 is configured such that the protruding portion 2a is located between the pair of regulating portions 1a-1a in a state of being assembled to the fixing member 1. As a result, rotation angles of the throttle lever 2 and the shaft member L are regulated within a predetermined range.

Figure 6A:
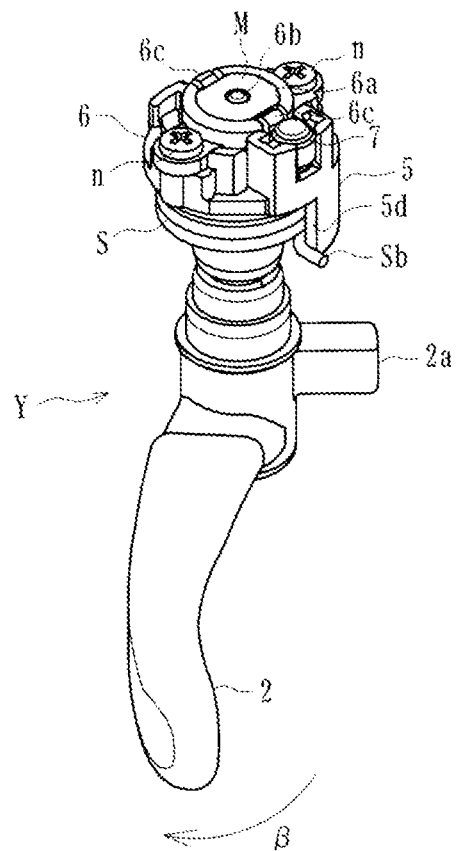
FIGS. 6A and 6B are perspective views illustrating a throttle lever of the throttle operating device and an integrated component which rotates together with the throttle lever.
Figure 9:
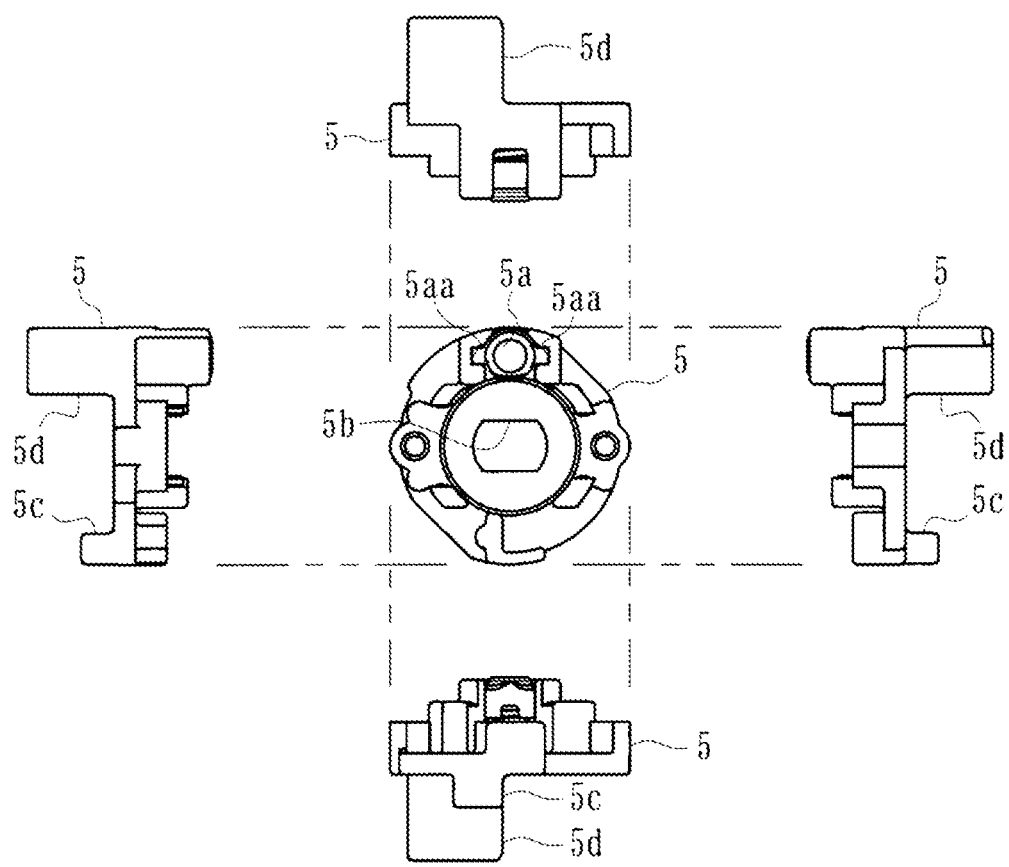
FIG. 9 is a five-view orthographic projection illustrating a rotating member of the throttle operating device.

As illustrated in FIGS. 6A to 7, the rotating member 5 is made rotatable in response to the rotational operation of the throttle lever 2. As illustrated in FIG. 9, a mounting portion 5a to which the resistance force applying unit 7 and a coil spring 8 (see FIG. 8) can be attached, a through hole 5b through which a tip portion of the shaft member L can be inserted, a first locking portion 5c capable of locking one end Sa (see FIG. 8) of the return spring S, and a second locking portion 5d capable of locking the other end Sb (see FIG. 8) of the return spring S are formed in the rotating member 5. However, when the shaft member L and the rotating member 5 are rotated by rotating the throttle lever 2, the rotating member 5 is urged toward an initial position by the return spring S.

Figure 10:
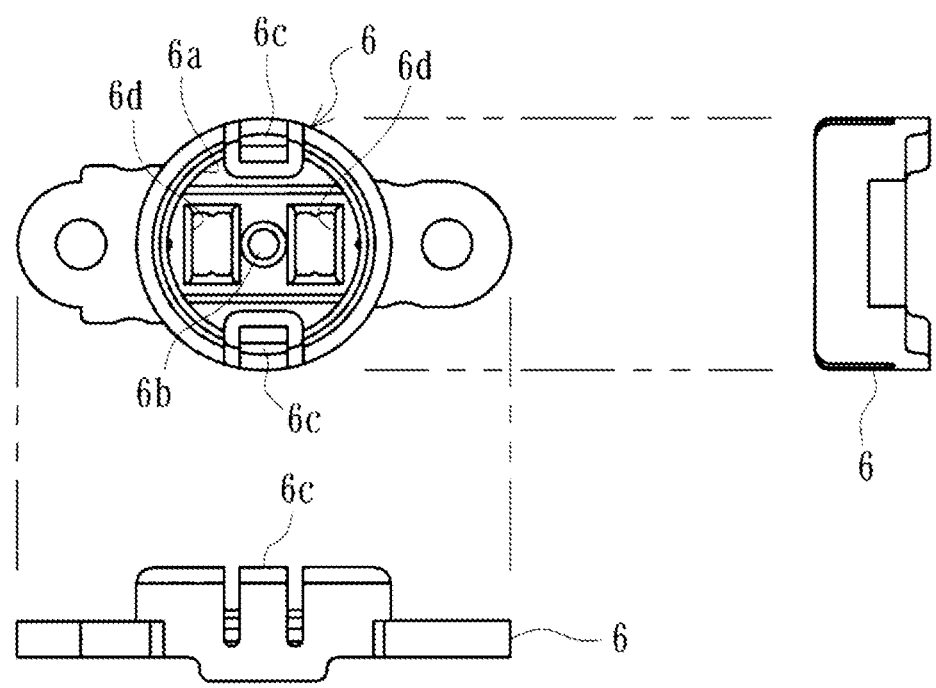
FIG. 10 is a three-view orthographic projection illustrating a mounting member of the throttle operating device.

Further, as illustrated in FIGS. 6A to 8, a mounting member 6 is attached to the rotating member 5 by a pair of mounting screws n. The mounting member 6 holds a magnet M. As illustrated in FIG. 10, the mounting member 6 is configured to include an accommodation recess portion 6a into which the magnet M can be fitted, a central convex portion 6b formed so as to protrude at a center of a bottom surface of the accommodation recess portion 6a, a pair of locking claws 6c formed so as to face each other at an opening edge portion of the accommodation recess portion 6a, and a fitting hole 6d formed on the bottom surface of the accommodation recess portion 6a.

Figure 11:
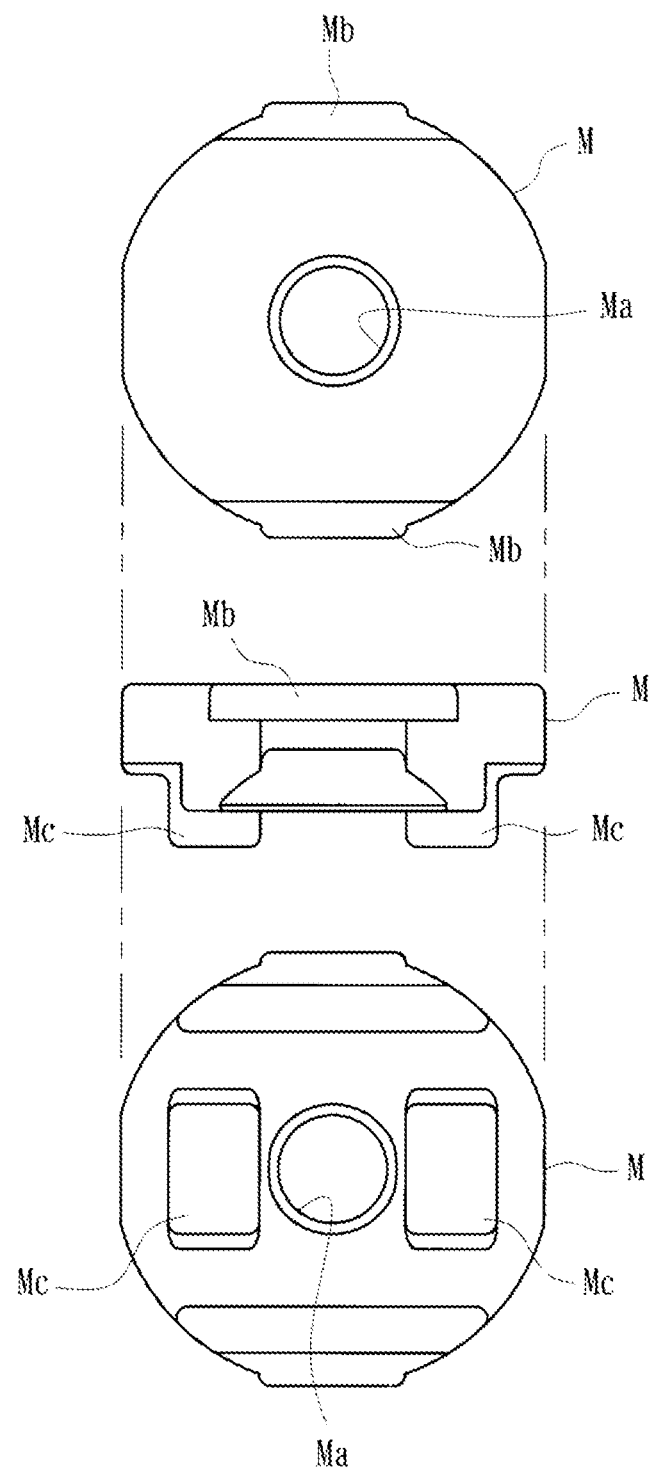
FIG. 11 is a three-view orthographic projection illustrating a magnet of the throttle operating device.

The magnet M is fitted and attached to the accommodation recess portion 6a of the mounting member 6 and is rotatable together with the shaft member L in response to the rotational operation of the throttle lever 2. As illustrated in FIG. 11, the magnet M is configured to include a through hole Ma through which the central convex portion 6b can be inserted, a notch portion Mb formed at an upper surface edge portion, and a pair of protruding portions Mc formed to protrude from a lower surface. Then, by inserting the protruding portion Mc into the fitting hole 6d while inserting the central convex portion 6b through the through hole Ma, the magnet M is accommodated in the accommodation recess portion 6a. In addition, the magnet M is prevented from coming off by pressing the locking claw 6c against the notch portion Mb.

Figure 6B:
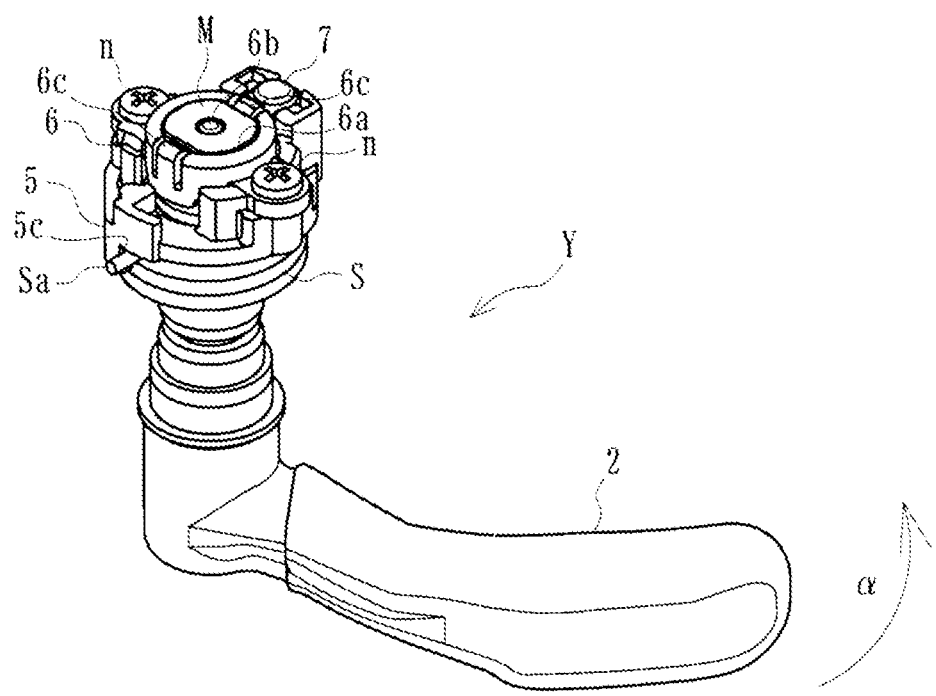

As described above, the throttle lever 2, the shaft member L, the rotating member 5, the mounting member 6, the magnet M, and the return spring S are assembled to form an integrated component Y, as illustrated in FIGS. 6A and 6B. Therefore, the integrated component Y is rotated with respect to the fixing member 1 by rotating the throttle lever 2 and the integrated component Y is urged toward the initial position by the return spring S. Therefore, by loosening an operating force on the throttle lever 2, the throttle lever 2 returns to the initial position.

Figure 5:
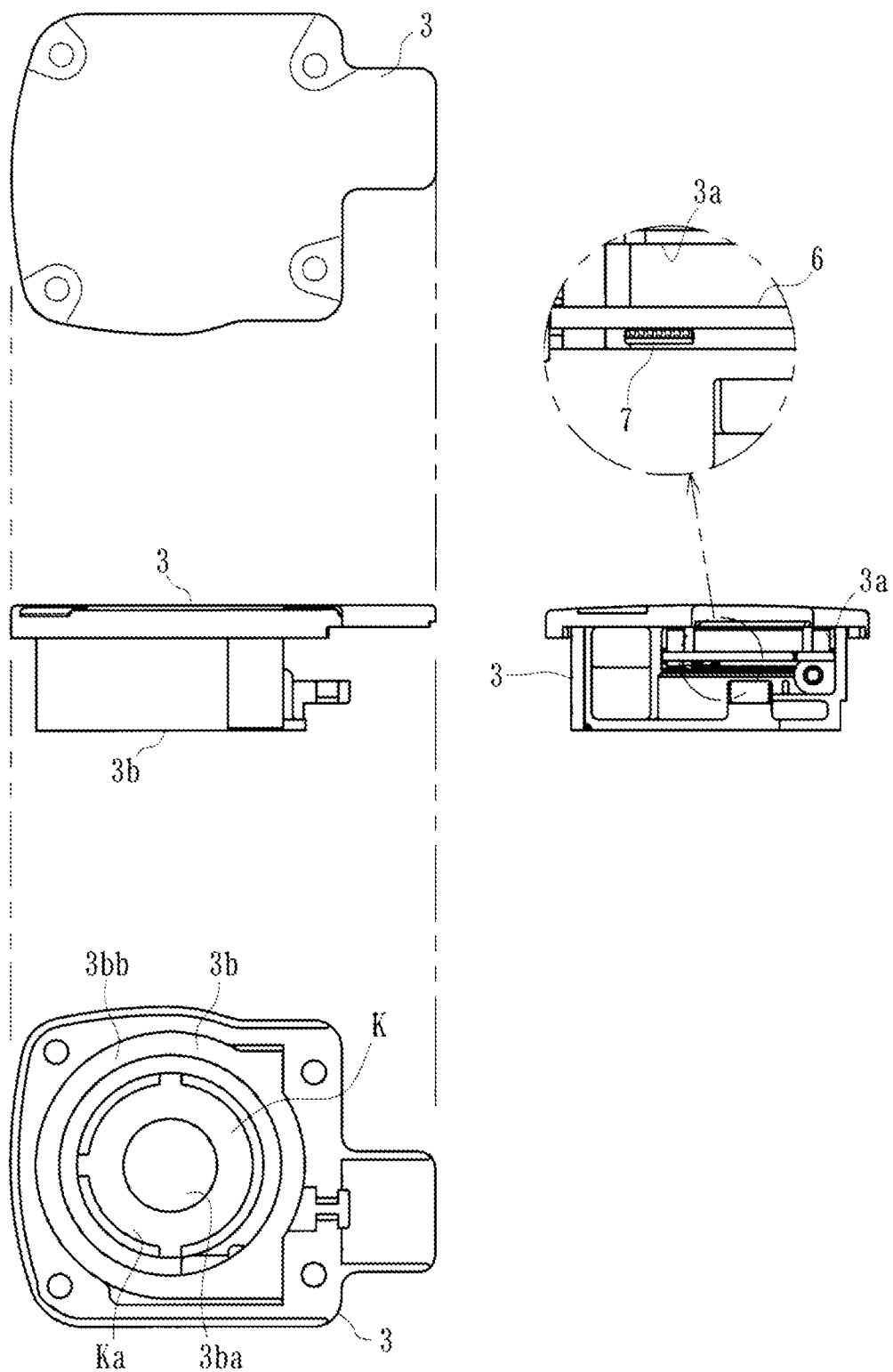
FIG. 5 is a four-view orthographic projection illustrating a cover member of the throttle operating device.

As illustrated in FIGS. 1 to 3, the cover member 3 is fixed by a mounting screw Na while covering an opening at the upper side of the fixing member 1. As illustrated in FIG. 5, the cover member 3 includes a molded part having the accommodation recess portion 3a which opens laterally and a lower surface 3b which faces the magnet M while being attached to the fixing member 1. A substrate 10 to which the detection sensor 11 is attached is accommodated in the accommodation recess portion 3b and the detection sensor 11 and the substrate 10 are waterproofed by being filled with a predetermined resin.

Further, in the cover member 3 according to the present embodiment, the sliding member K is fixed to the lower surface 3b of the cover member 3 by insert-molding. The sliding member K is made of an annular metal member and is configured so that the resistance force applying unit 7, which will be described below, can slide. An inner region of the sliding member K on the lower surface 3b of the cover member 3 forms an abutment surface 3ba with which the magnet M is in contact and on which the magnet M can rotate, so that the magnet M can be stably rotated.

Further, the cover member 3 can perform sealing by pressing the sealing member 9 while being attached to the fixing member 1. That is, when the cover member 3 is attached to the fixing member 1, as illustrated in FIG. 3, a pressing surface 3bb formed in a peripheral edge region of the lower surface 3b of the cover member 3 presses the sealing member 9, and thus the inside (an internal space where the rotating member 5 and the like are located) of the fixing member 1 can be sealed.

The detection sensor 11 can detect the rotational operation angle of the throttle lever 2. In the present embodiment, the detection sensor 11 includes an angle sensor which detects the magnetic change of the magnet M and detects the rotation angle thereof. That is, when the magnet M rotates with the rotational operation of the throttle lever 2, the detection sensor 11 detects the magnetic change of the magnet M due to the rotation and the rotational operation angle of the throttle lever 2 can be detected.

It is configured such that, when the detection sensor 11 detects the rotational operation angle of the throttle lever 2, the detection signal is transmitted to an engine control unit (ECU) provided in the vehicle, a predetermined device mounted on the vehicle, or the like via a wiring h connected to the substrate 10. Then, based on the rotational operation angle of the throttle lever 2, the engine (drive source) of the vehicle is controlled, or a predetermined device of the vehicle is operated (for example, the vehicle moves backward, or an auto cruise system is activated or stopped).

That is, in the throttle operating device according to the present embodiment, as illustrated in FIGS. 1 and 2, the throttle lever 2 can be rotated in a forward direction α and a reverse direction β with respect to the fixing member 1 and the detection sensor 11 is attached to the cover member 3 at a position corresponding to the magnet M and can detect the rotational operation of the throttle lever 2 in the forward direction α and the reverse direction β. The throttle operating device is configured so that when the throttle lever 2 is rotated in the forward direction α, the engine (drive source) of the vehicle can be controlled. When the throttle lever 2 is rotated in the reverse direction β, a predetermined device mounted on the vehicle can be operated or the operation of the predetermined device can be stopped.

Specifically, one end Sa of the return spring S is assembled so as to be lockable to the first locking portion 5c (see FIG. 6B) of the rotating member 5 and the first fixing portion 1d (see FIG. 14) of the fixing member 1, and the other end Sb is assembled so as to be lockable to the second locking portion 5d (see FIG. 6A) of the rotating member 5 and the second fixing portion 1e (see FIG. 14) of the fixing member 1.

Then, when the throttle lever 2 is rotated in the forward direction α and the rotating member 5 rotates in the same direction, one end Sa of the return spring S is locked to the first locking portion 5c and pivots (that is, one end Sa is separated from the first fixing portion 1d while being taken by the rotating member 5) in response to the rotation of the rotating member 5, and the other end Sb is locked and fixed to the second fixing portion 1e of the fixing member 1. As a result, an urging force is applied in a direction of returning the throttle lever 2 to the initial position.

Further, when the throttle lever 2 is rotated in the reverse direction β and the rotating member 5 rotates in the same direction, the other end Sb of the return spring S is locked to the second locking portion 5d and pivots (that is, the other end Sb is separated from the second fixing portion 1e while being taken by the rotating member 5) in response to the rotation of the rotating member 5, and one end Sa is locked and fixed to the first fixing portion 1d of the fixing member 1. As a result, an urging force is applied in the direction of returning the throttle lever 2 to the initial position.

Figure 14:
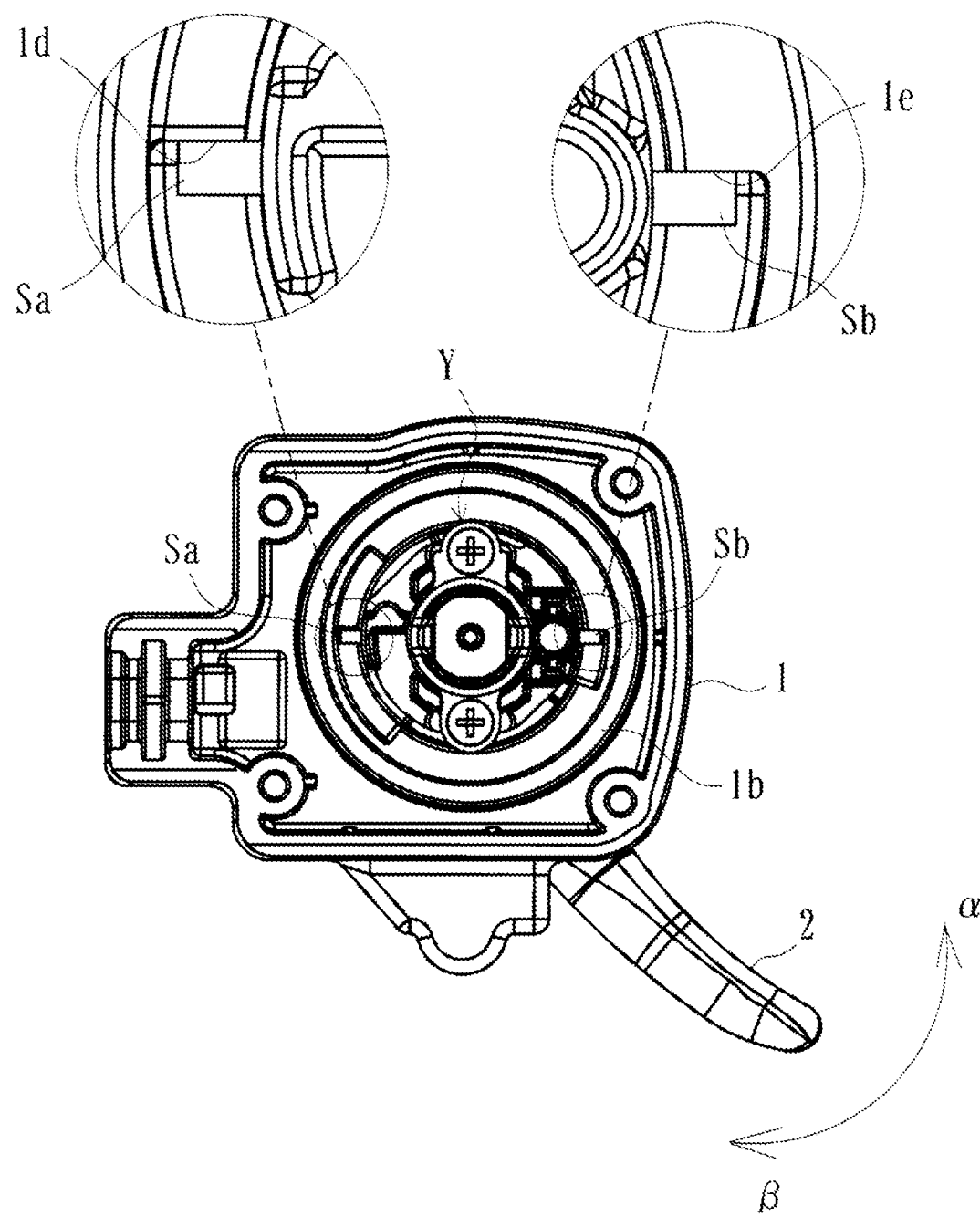
FIG. 14 is a plan view illustrating a mounting state of a return spring with the cover member of the throttle operating device removed.
Figure 15:
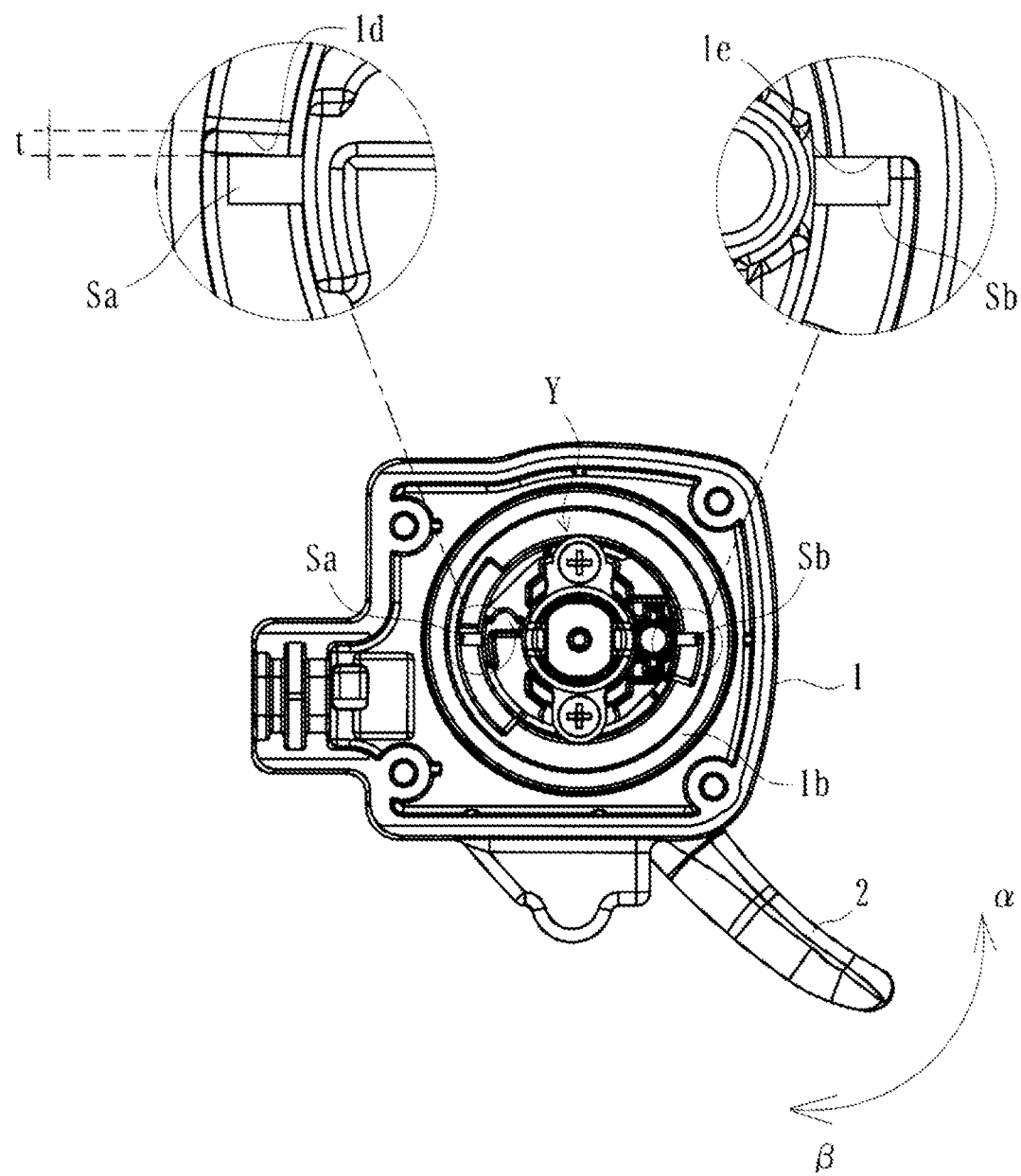
FIG. 15 is a plan view illustrating a mounting state of a return spring with a cover member of a throttle operating device according to another embodiment of the present disclosure removed.

However, in the present embodiment, as illustrated in FIG. 14, although one end Sa of the return spring S are assembled in contact with each other and the first fixing portion 1d and the other end Sb of the return spring S and the second fixing portion 1e are assembled in contact with each other, as illustrated in FIG. 15, a clearance of a dimension t may be provided between one end Sa of the return spring S and the first fixing portion 1d (or between the other end Sb of the return spring S and the second fixing portion 1e). By having such a clearance, at the start of the rotational operation of the throttle lever 2, it is possible to generate a rotation region (mechanical play region) in which the urging force due to the return spring S is not applied.

Further, the throttle operating device according to the present embodiment is provided with the resistance force applying unit 7 which can generate friction during the rotational operation of the throttle lever 2 to apply a resistance force. As illustrated in FIGS. 6A to 8, such resistance force applying unit 7 is attached to the mounting portion 5a of the rotating member 5 and includes a resin member urged upward by the coil spring 8. When the rotating member 5 rotates with the rotational operation of the throttle lever 2, the resistance force applying unit 7 can pivot together with the rotating member 5.

Figure 12:
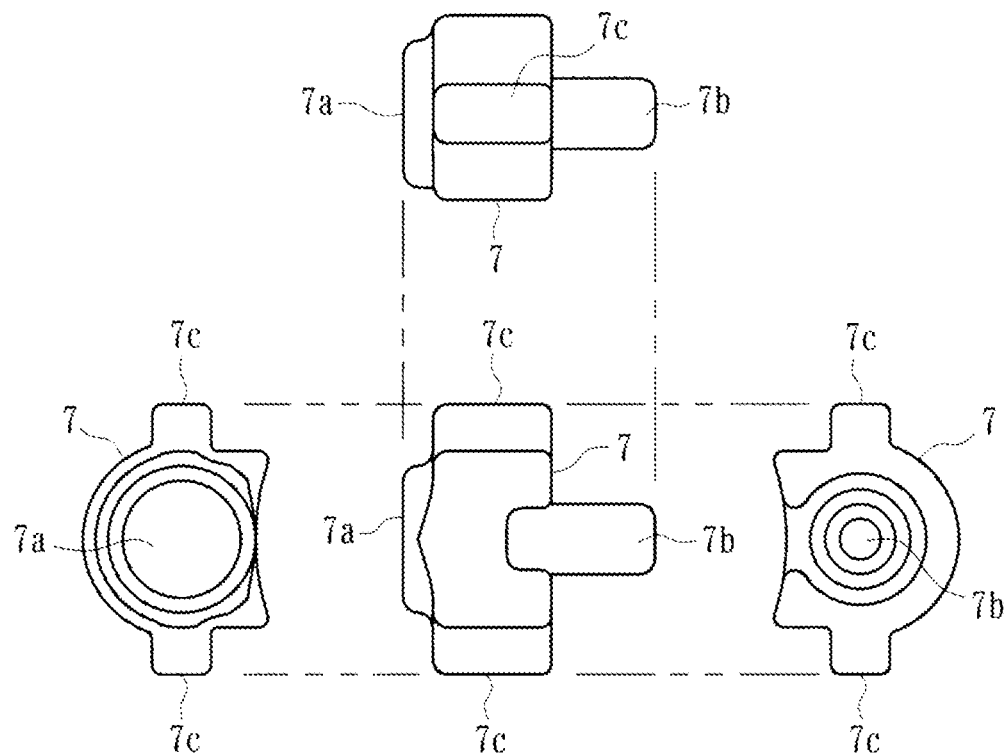
FIG. 12 is a four-view orthographic projection illustrating a resistance force applying unit of the throttle operating device.

Specifically, in the resistance force applying unit 7, as illustrated in FIG. 12, a protruding end surface 7*a*, a boss portion 7*b*, and protruding portions 7*c* are integrally formed. The protruding end surface 7*a* includes a plane formed at the protruding end of the resistance force applying unit 7 and includes a surface capable of sliding on a sliding surface Ka of the sliding member K formed on the cover member 3. The boss portion 7*b* has a protruding shape formed on a lower surface of the resistance force applying unit 7 and is capable of holding the coil spring 8. Further, the protruding portions 7*c* include a pair of bulging portions formed on side surfaces of the resistance force applying unit 7. By matching the protruding portion 7*c* with a holding groove 5*aa* (see FIGS. 8 and 9) formed in the mounting portion 5*a* of the rotating member 5, the resistance force applying unit 7 can be positioned and the displacement of the resistance force applying unit 7 can be guided.

Figure 13:
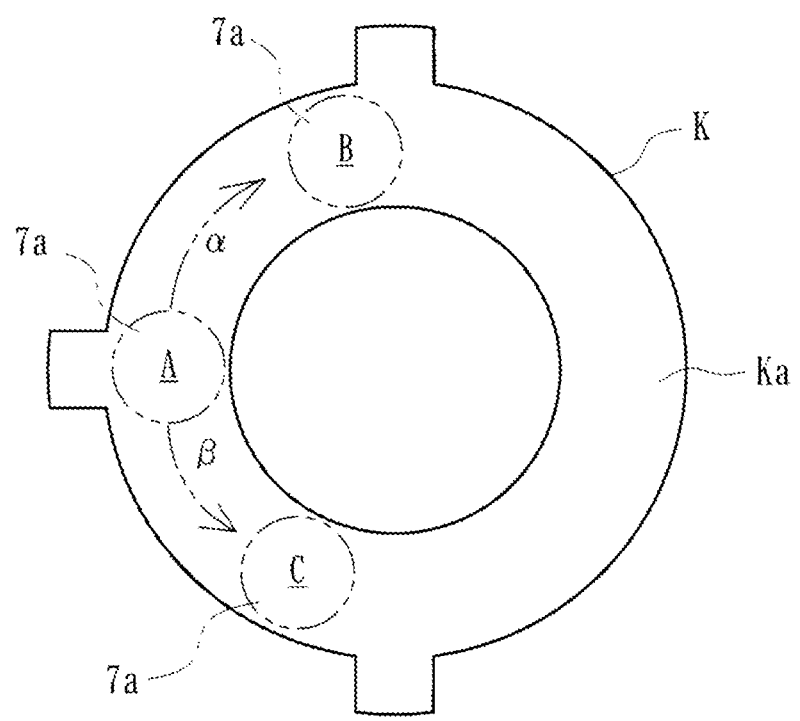
FIG. 13 is a schematic view illustrating sliding of the resistance force applying unit of the throttle operating device with respect to a sliding member.

However, the resistance force applying unit 7 is urged by the coil spring 8 toward the sliding surface Ka of the sliding member K, and as illustrated in FIG. 3, the protruding end surface 7*a* is in contact with the sliding surface Ka. Further, the rotating member 5 rotates with the rotational operation of the throttle lever 2 and the resistance force applying unit 7 rotates together with the rotating member 5. Then, as illustrated in FIG. 13, when the throttle lever 2 is rotated in the forward direction α, the protruding end surface 7*a* in contact with a position A slides to a position B. Also, when the throttle lever 2 is rotated in the reverse direction β, the protruding end surface 7*a* in contact with the position A can slide to a position C. That is, the sliding surface Ka formed on the cover member 3 includes a surface of the sliding member K formed along a movement locus of the resistance force applying unit 7. Therefore, in a process of sliding the protruding end surface 7*a* from the position of A to the position of B or the position of C, friction can be generated to apply a resistance force.

According to the present embodiment, the throttle lever 2 can be rotated in the forward direction α and the reverse direction β. Also, it is possible to control the drive source (engine) of the vehicle when the throttle lever 2 is rotated in the forward direction α, and it is possible to operate a predetermined device mounted on the vehicle or stop the operation of the predetermined device when the throttle lever 2 is rotated in the reverse direction β. Therefore, by rotating the throttle lever 2, it is possible to smoothly operate other devices possessed by the vehicle in addition to the throttle control.

Further, the detection sensor 11 according to the present embodiment can detect the rotational operation angle of the throttle lever 2 based on the magnetic change of the magnet M rotating in response to the throttle lever 2. Also, the detection sensor 11 is attached to the cover member 3 at the position corresponding to the magnet M and can detect the rotational operation of the throttle lever 2 in the forward direction α and the reverse direction β. Therefore, the cover member 3 has a function of covering the opening of the fixing member 1 and a function of attaching the detection sensor 11, and it is possible to easily take waterproof measures for a portion (in particular, the accommodation recess portion 3*a*) to which the detection sensor 11 is attached.

Further, in the rotating member 5 according to the present embodiment, the first locking portion 5*c* capable of locking one end Sa of the return spring S and the second locking portion 5*d* capable of locking the other end Sb are formed. In addition, when the throttle lever 2 rotates in the forward direction α, one end Sa of the return spring S is locked to the first locking portion 5*c* and pivots in response to the rotation of the rotating member 5 and the other end Sb is locked and fixed to the fixing member 1. When the throttle lever 2 rotates in the reverse direction β, the other end Sb of the return spring S is locked to the second locking portion 5*d* and pivots in response to the rotation of the rotating member 5 and one end Sa is locked and fixed to the fixing member 1. Therefore, when the throttle lever 2 is rotated in the forward direction α and the reverse direction β, the urging force due to one return spring S can be smoothly and surely applied.

Furthermore, the throttle operating device includes the resistance force applying unit 7 which can generate friction during the rotational operation of the throttle lever 2 in the forward direction α and the reverse direction β to apply a resistance force. Therefore, the operability at the time of the rotational operation (in the present embodiment, during the rotational operation in the forward direction α and the reverse direction β) of the throttle lever 2 can be improved and operation feeling can be made similar, compared with one of the related art in which an operation of a throttle lever is transmitted to an engine side via an operation wire.

In addition, according to the present embodiment, the rotating member 5 is provided, which is connected to the shaft member L and rotates in response to the rotational operation of the throttle lever 2, and the resistance force applying unit 7 is configured to be attached to the rotating member 5 and generate friction by sliding on the sliding surface Ka (in the present embodiment, the sliding surface Ka of the sliding member K) formed on the cover member 3. Therefore, in addition to the function of covering the opening of the fixing member 1 and the function of attaching the detection sensor 11, the cover member 3 can have a function of holding the sliding surface Ka for the resistance force applying unit 7.

Further, according to the present embodiment, the sliding surface Ka formed on the cover member 3 includes the surface Ka of the sliding member K formed along the movement locus of the resistance force applying unit 7. Therefore, the resistance force applying unit 7 can be reliably slid along the sliding surface Ka. Furthermore, the resistance force applying unit 7 according to the present embodiment includes a resin member urged toward the sliding surface Ka by the coil spring 8 (urging unit) attached to the rotating member 5 and the sliding member K includes a metal member insert-molded into the cover member 3. Therefore, the frictional force due to the resistance force applying unit 7 can be stably generated.

According to the present embodiment, the sealing member 9 for sealing the inside of the fixing member 1 is provided and the cover member 3 can perform sealing by pressing the sealing member 9 while being attached to the fixing member 1. Therefore, in addition to the function of covering the opening of the fixing member 1 and the function of attaching the detection sensor 11, the cover member 3 can have a function of maintaining the sealing by the sealing member 9.

In addition, according to the present embodiment, the cover member 3 covering the opening of the fixing member 1 is provided and the detection sensor 11 is attached to the cover member 3. Therefore, the cover member 3 has the function of covering the opening of the fixing member 1 and the function of attaching the detection sensor 11, and it is possible to easily take waterproof measures for the portion to which the detection sensor 11 is attached.

Hereinafter, a throttle operating device according to a second embodiment of the present disclosure will be described.

Figure 16:
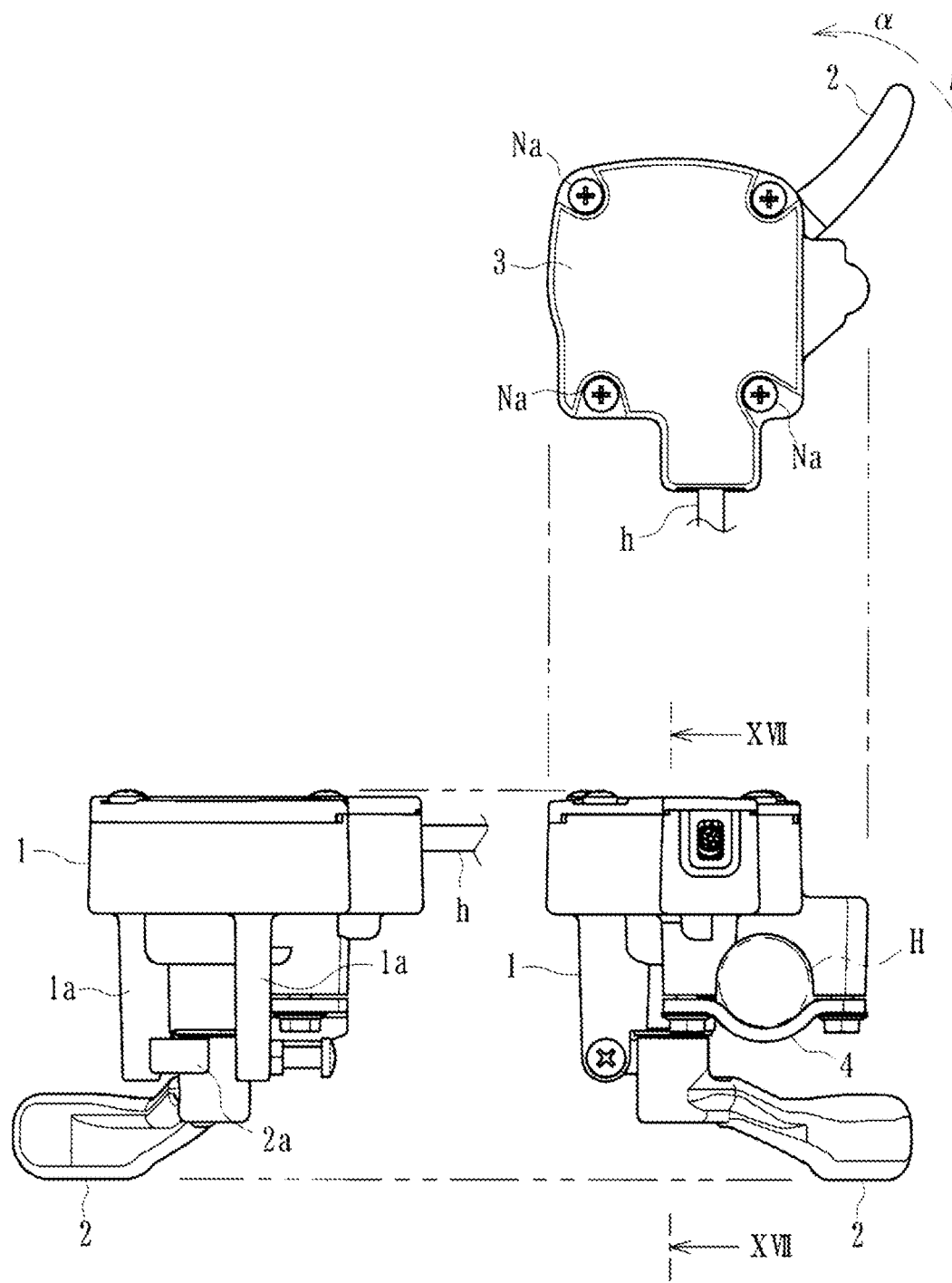
FIG. 16 is a three-view orthographic projection illustrating a throttle operating device according to a second embodiment of the present disclosure.
Figure 17:
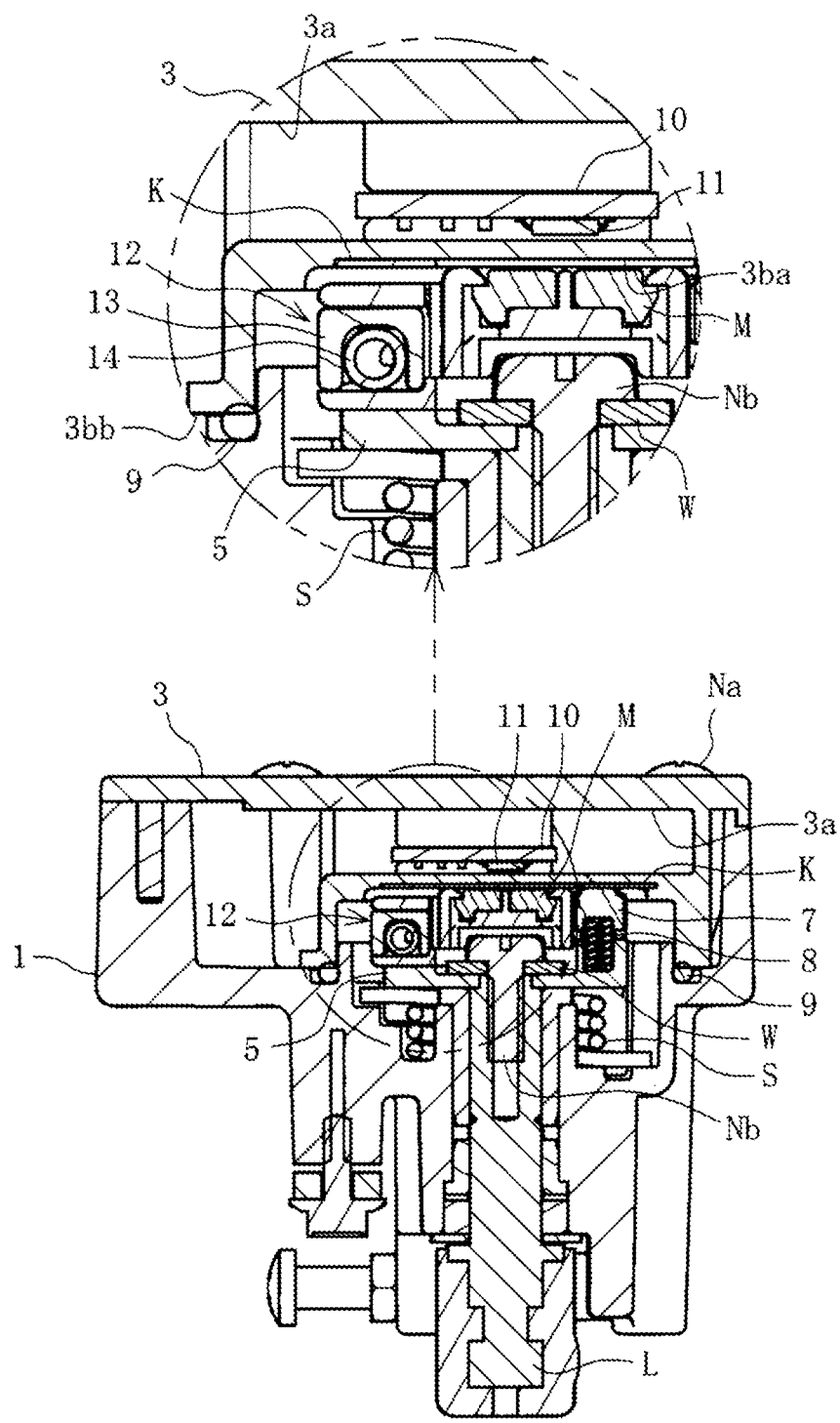
FIG. 17 is a cross-sectional view taken along the line XVII-XVII of FIG. 16.

As similar to that of the first embodiment, the throttle operating device according to the second embodiment is fixed to a handlebar of a vehicle such as an ATV or a buggy, a ship such as a PWC (personal watercraft), or a vehicle such as a snow vehicle (in the present embodiment, a vehicle such as an ATV or a buggy) so that an engine (drive source) of the vehicle can be controlled. As illustrated in FIGS. 16 and 17, the throttle operating device is configured to include the fixing member 1, the throttle lever 2 which is a so-called thumb lever, the cover member 3, the rotating member 5, the resistance force applying unit 7, the detection sensor 11, the return spring S, the sliding member K, and an operating load generating unit 12. Except for parts described separately in the present embodiment, the parts common to those of the first embodiment are designated by the same reference numerals and letters and detailed description thereof will be omitted.

Figure 18:
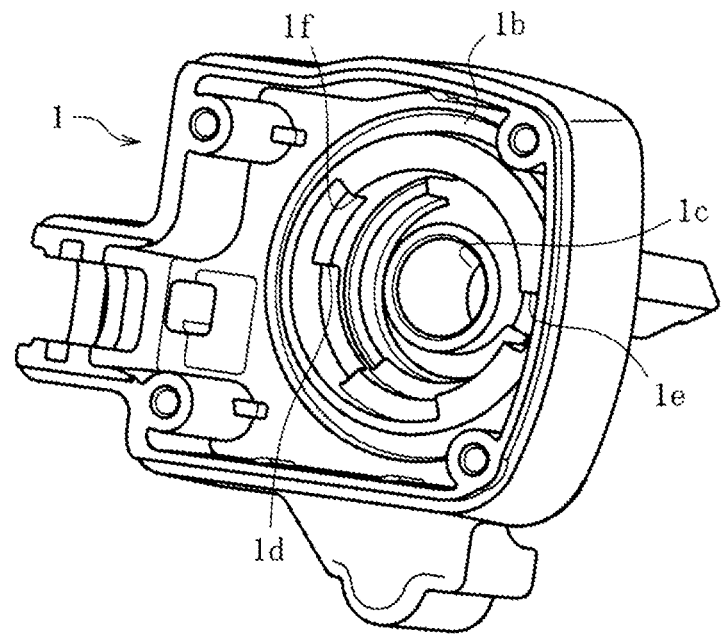
FIG. 18 is a perspective view illustrating a fixing member of the throttle operating device.
Figure 19:
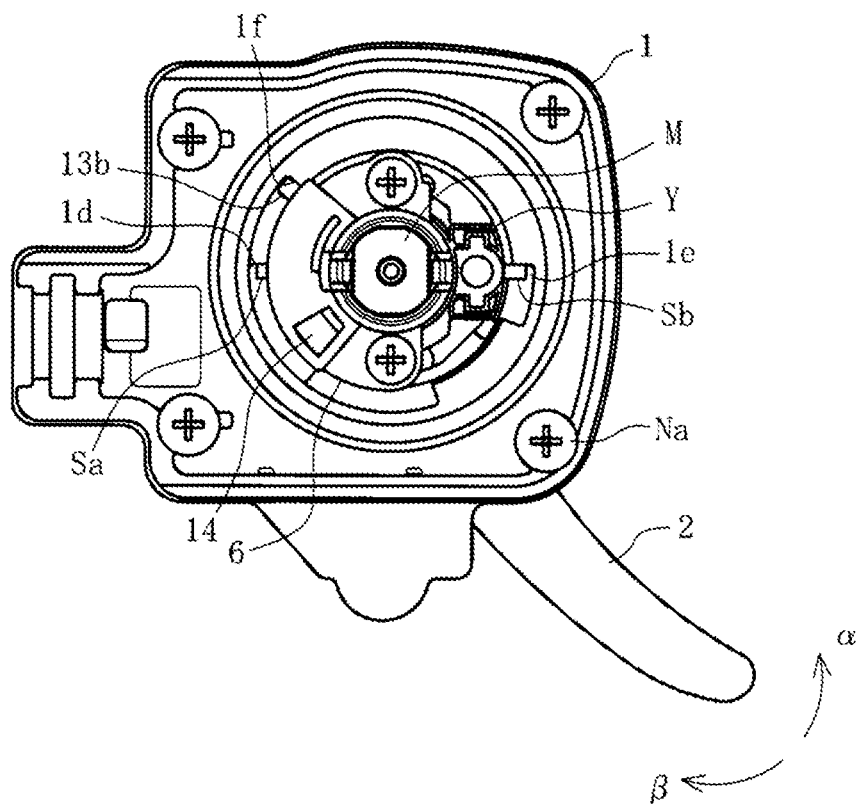
FIG. 19 is a plan view illustrating a state in which an integrated component is attached to the fixing member.
Figure 20:
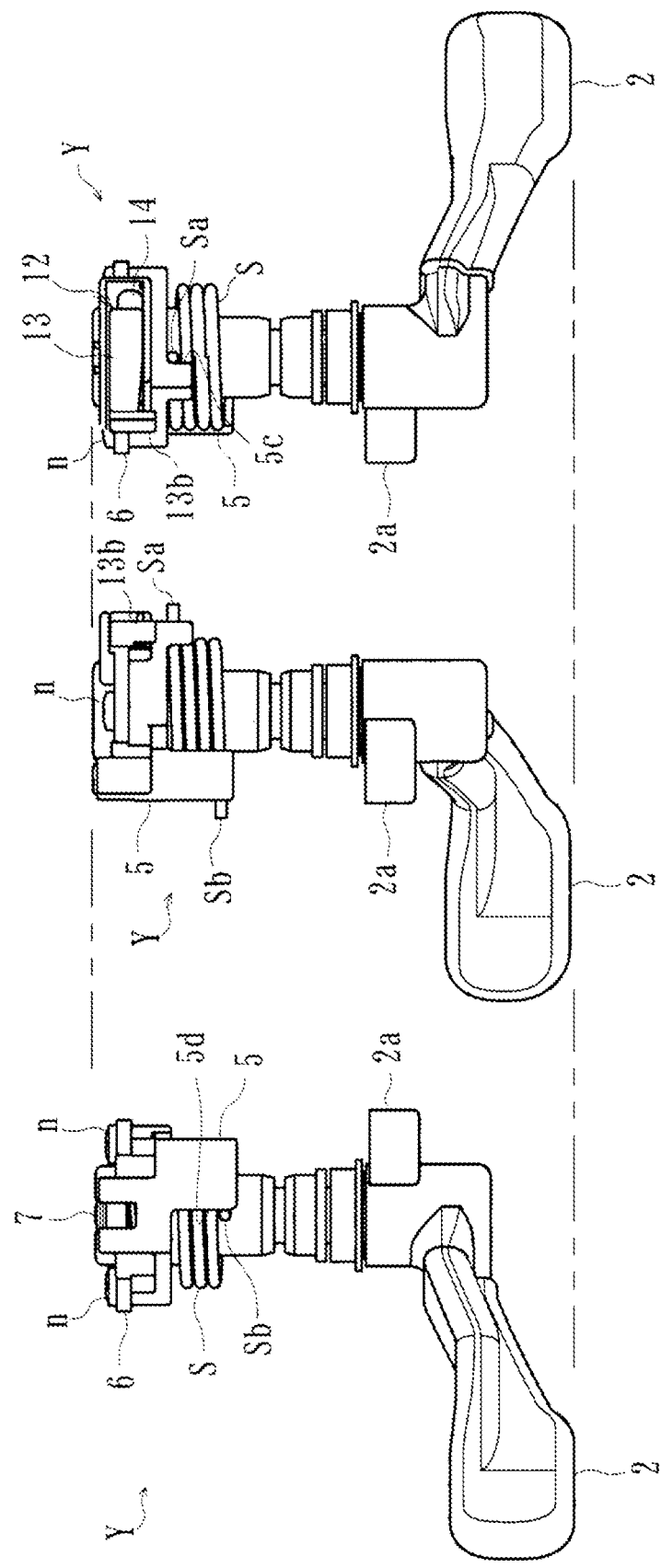
FIG. 20 is a three-view orthographic projection illustrating the integrated component.

The fixing member 1 is fixed to the handlebar H to pivotally support the throttle lever 2 and is fixed to the vicinity of the grip formed at the tip of the handlebar H of the vehicle. As illustrated in FIGS. 18 and 19, the fixing member 1 has the opening at the upper side to form the accommodation recess portion inside and the holding member 4 is attached to the fixing member 1. The fixing member 1 can be fixed by holding the handlebar H with the holding member 4.

Also, the mounting groove 1b for fitting and positioning the sealing member 9 (see FIG. 17), the through hole 1c through which the shaft member L is inserted to allow a rotational operation of the throttle lever 2, a first fixing portion 1d which locks and fixes one end Sa (see FIGS. 23 to 25) of the return spring S, a second fixing portion 1e which locks and fixes the other end Sb (see FIGS. 23 to 25) of the return spring S, and a third fixing portion if which locks and fixes a pressed portion 13b (see FIGS. 25 to 28) of the operating load generating unit 12 are formed on a bottom surface of the accommodation recess portion formed inside the fixing member 1.

Here, as similar to that of the first embodiment, the throttle operating device according to the present embodiment is configured such that the throttle lever 2 can be pivoted in a forward direction α and a reverse direction β with respect to the fixing member 1, and the detection sensor 11 is attached to the cover member 3 at the position corresponding to the magnet M and can detect rotational operations of the throttle lever 2 in the forward direction α and the reverse direction β. Also, the throttle operating device is configured such that the engine (drive source) of the vehicle can be controlled when the throttle lever 2 is rotated in the forward direction α and a predetermined device mounted on the vehicle can be operated or the operation of the predetermined device can be stopped when the throttle lever 2 is rotated in the reverse direction β.

Figure 21:
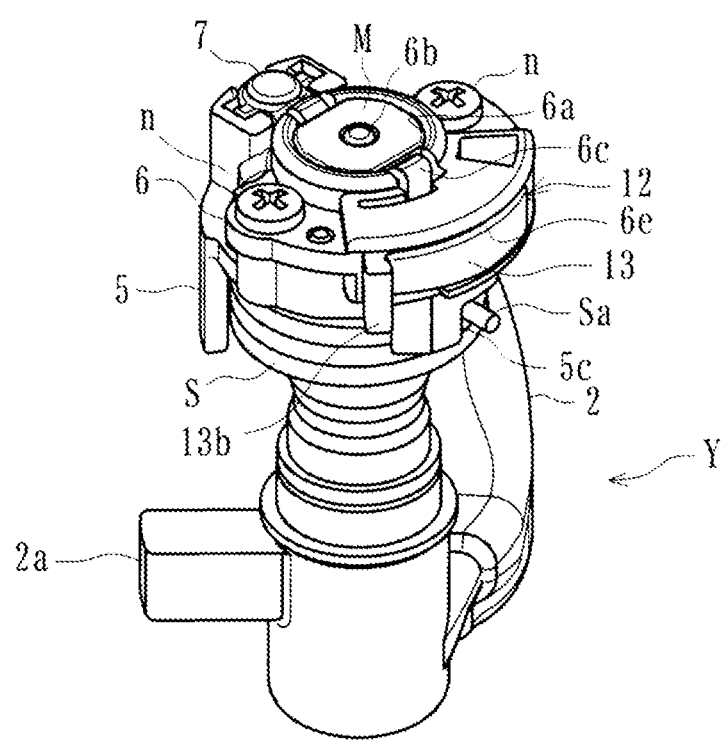
FIG. 21 is a perspective view illustrating the integrated component.
Figure 22:
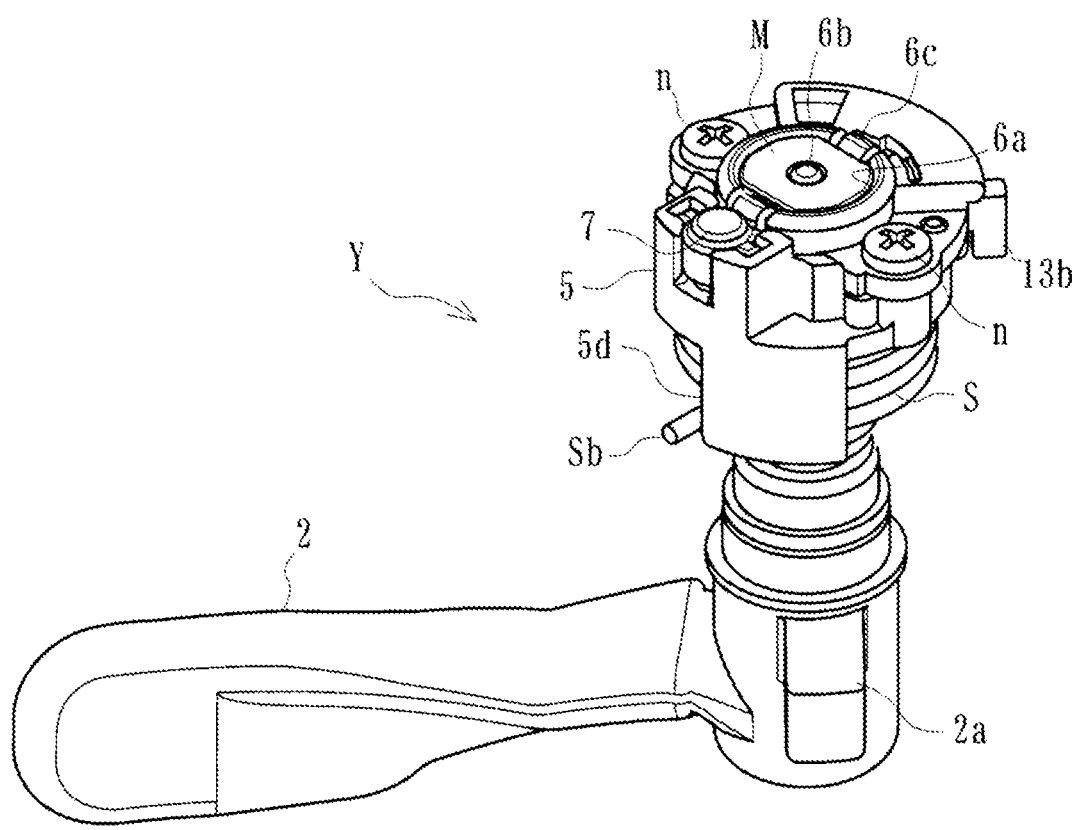
FIG. 22 is a perspective view illustrating the integrated component.

Further, the return spring S is assembled such that one end Sa of the return spring S can be locked to a first locking portion 5c (see FIGS. 21 and 25) of the rotating member 5 and a first fixing portion 1d (see FIGS. 18 and 19) of the fixing member 1, and the other end Sb can be locked to a second locking portion 5d (see FIGS. 22 and 25) of the rotating member 5 and the second fixing portion 1e (see FIGS. 18 and 19) of the fixing member 1. Then, when the throttle lever 2 is rotated in the forward direction α and the rotating member 5 rotates in the same direction, one end Sa of the return spring S is locked to the first locking portion 5c and pivots in response to the rotation of the rotating member 5 and the other end Sb is locked and fixed to the second fixing portion 1e of the fixing member 1. Therefore, an urging force is applied in a direction of returning the throttle lever 2 to the initial position.

Also, when the throttle lever 2 is rotated in the reverse direction β and the rotating member 5 rotates in the same direction, the other end Sb of the return spring S is locked to the second locking portion 5d and pivots in response to the rotation of the rotating member 5 and one end Sa is locked and fixed to the first fixing portion 1d of the fixing member 1. Therefore, an urging force is applied in a direction of returning the throttle lever 2 to the initial position.

However, the throttle operating device according to the present embodiment includes the operating load generating unit 12 which generates a predetermined operating load when the throttle lever is rotated in the reverse direction β and does not generate an operating load when the throttle lever 2 is rotated in the forward direction α. As a result, the operating load in the reverse direction β of the throttle lever 2 is set to be larger than the operating load in the forward direction α.

Figure 23:
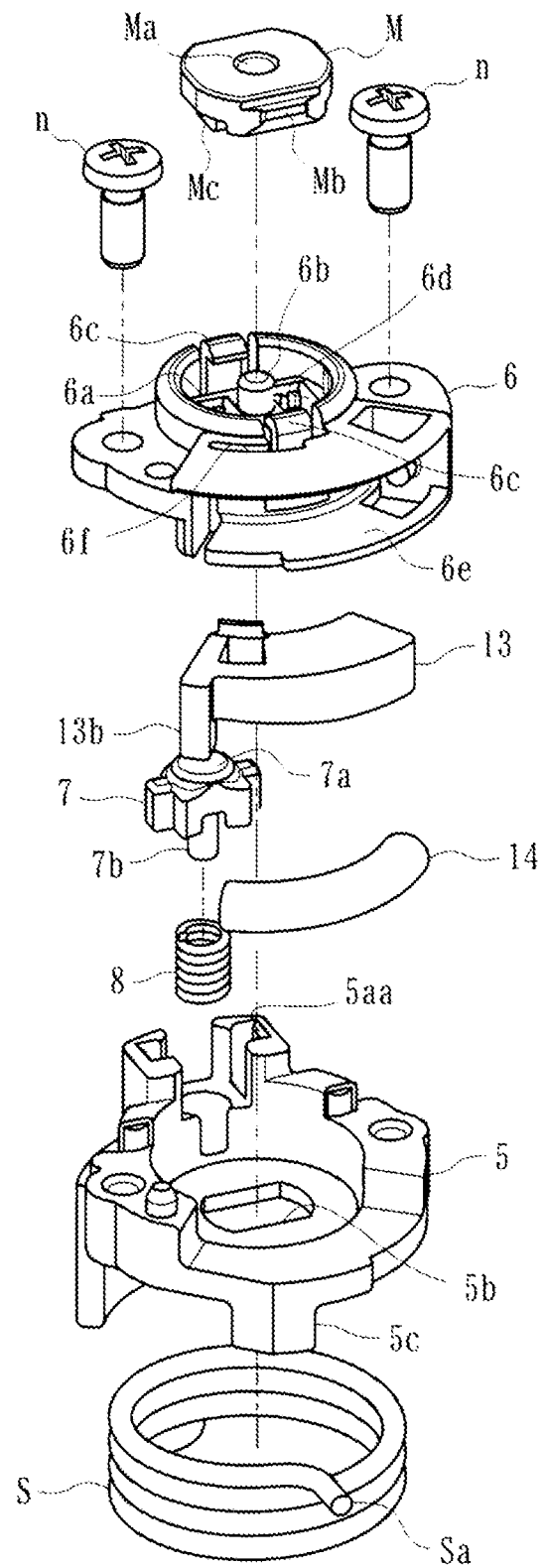
FIG. 23 is an exploded perspective view illustrating an assembled state of a tip portion of the integrated component in the throttle operating device.
Figure 24:
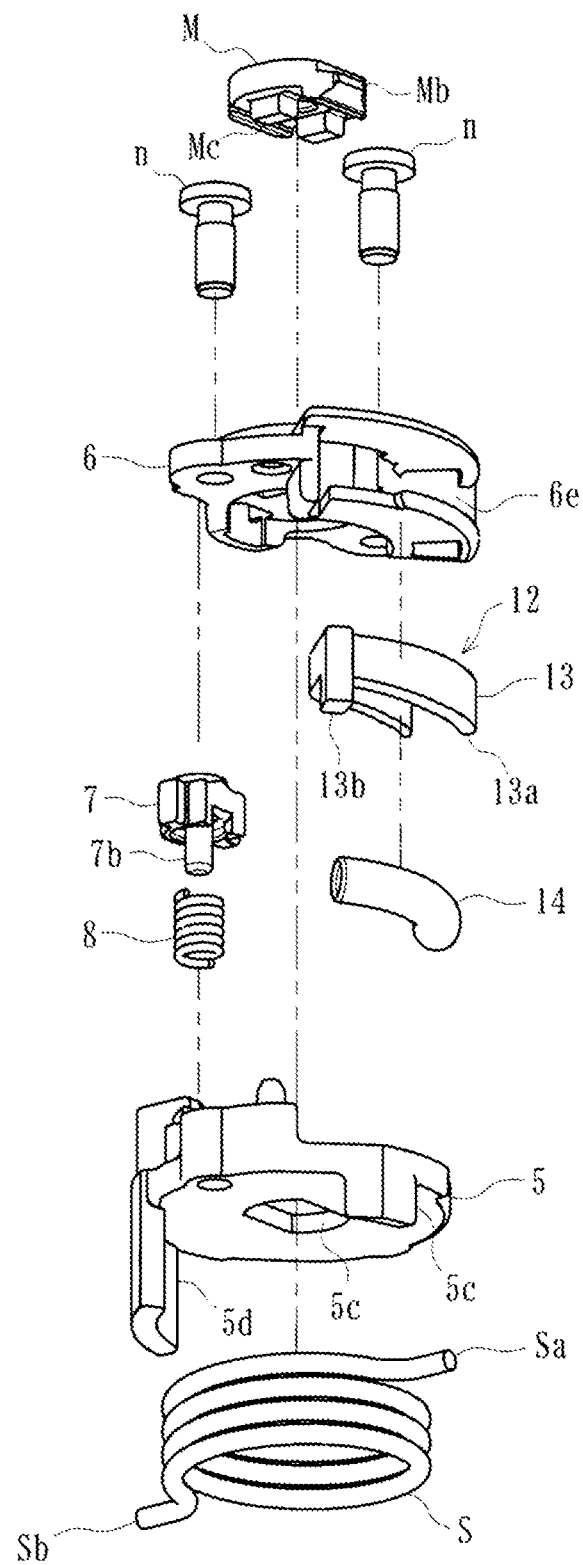
FIG. 24 is an exploded perspective view illustrating the assembled state of the tip portion of the integrated component in the throttle operating device.
Figure 25:
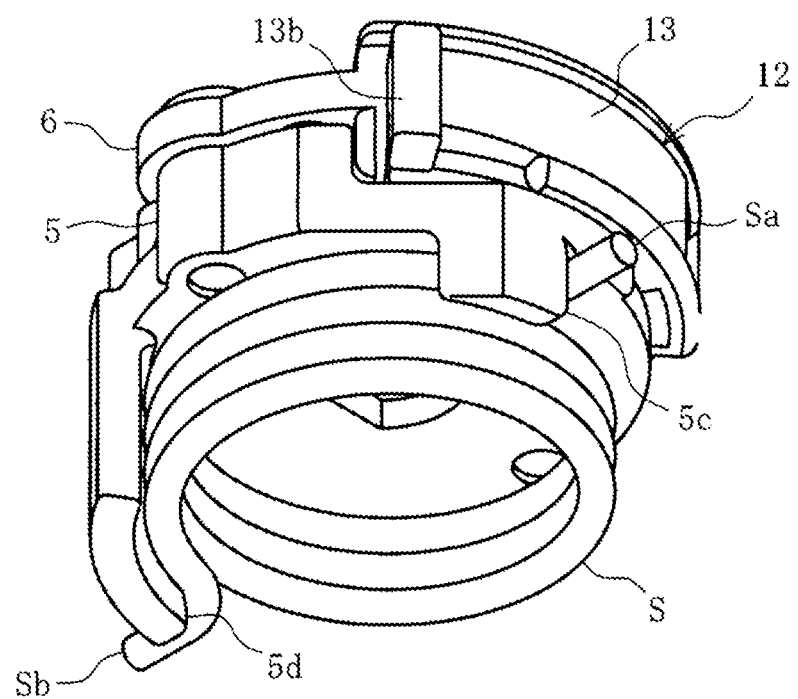
FIG. 25 is a perspective view illustrating the assembled state of the tip portion of the integrated component in the throttle operating device.
Figure 26:
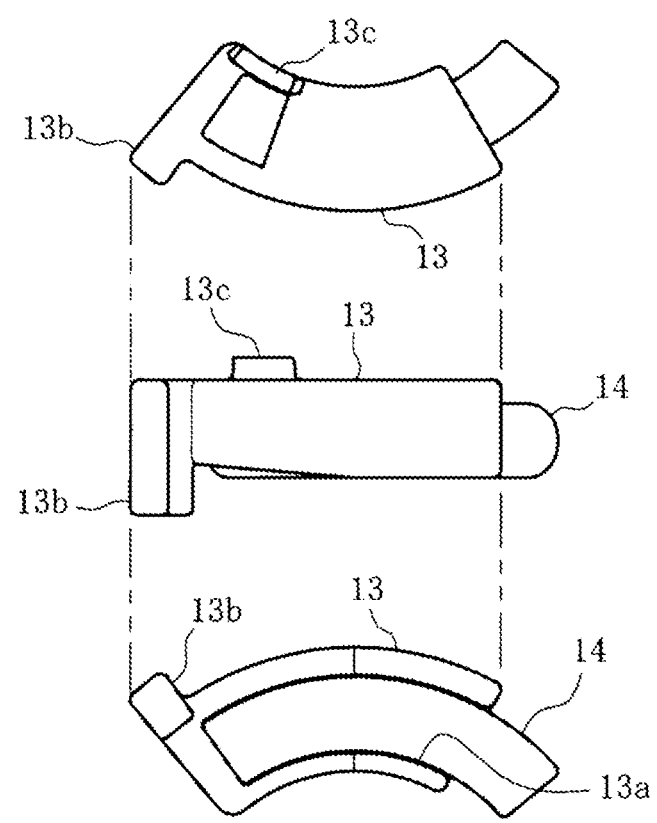
FIG. 26 is a three-view orthographic projection illustrating an operating load generating unit of the throttle operating device.
Figure 27A:
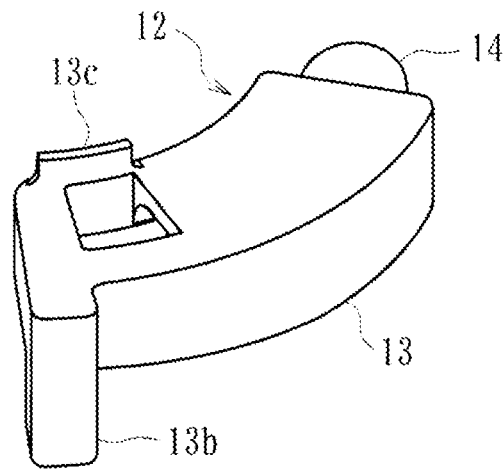
FIGS. 27A and 27B are perspective views illustrating the resistance force applying unit of the throttle operating device.
Figure 27B:
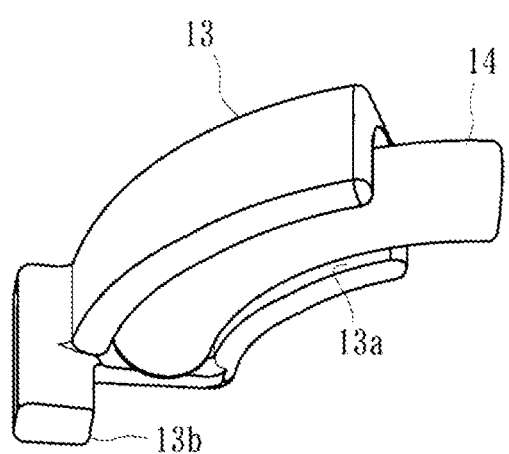
Figure 28:
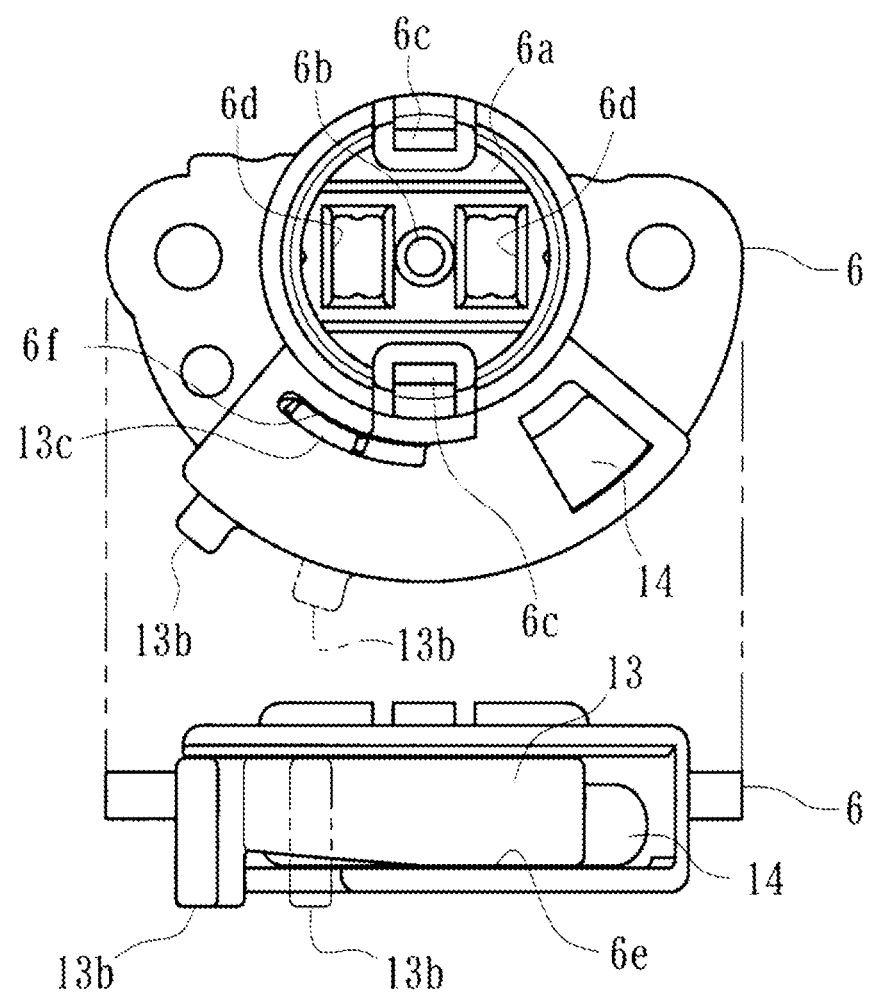
FIG. 28 is a plan view and a front view illustrating a mounting member with the resistance force applying unit attached.
Figure 29:
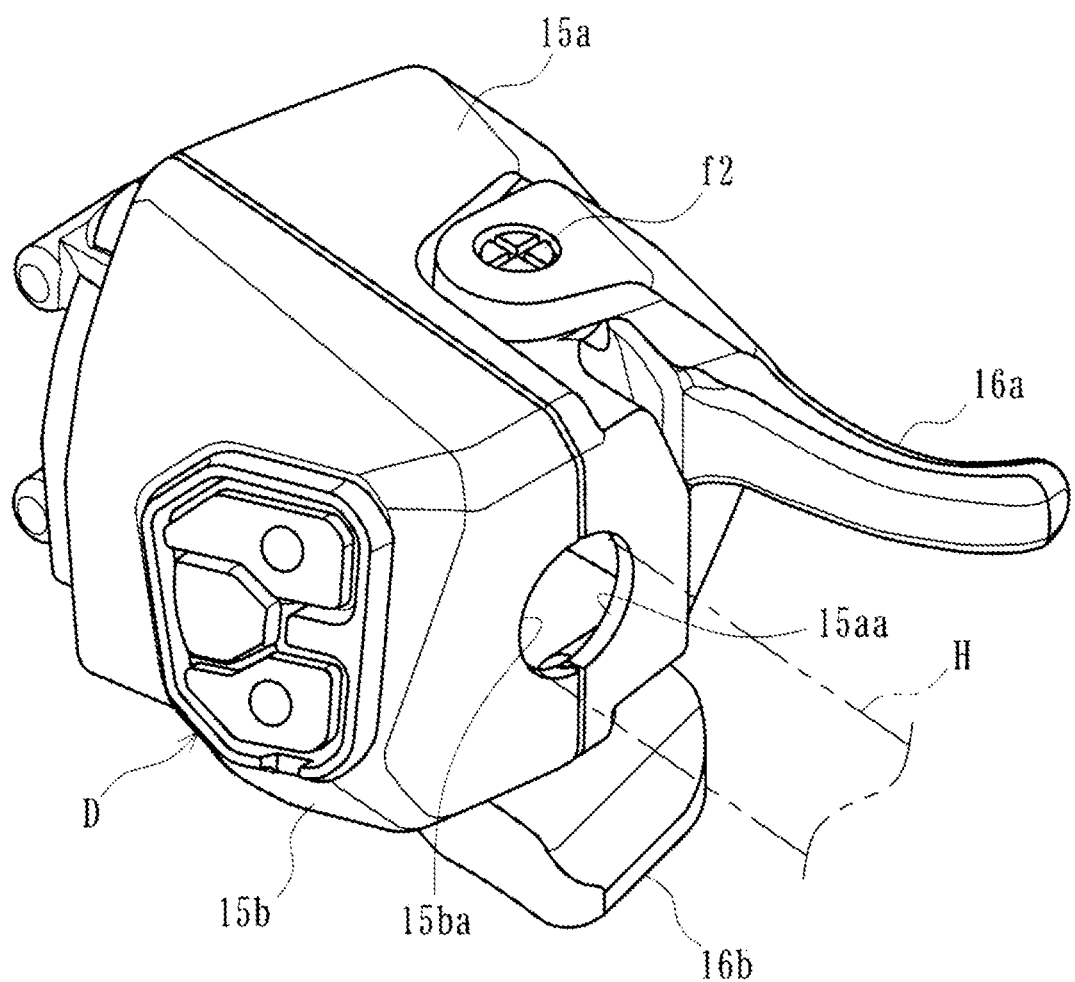
FIG. 29 is a perspective view illustrating a throttle operating device according to a third embodiment of the present disclosure.

As illustrated in FIGS. 23, 24, and 28, the operating load generating unit 12 is attached to a mounting groove portion 6e formed in the mounting member 6 and can rotate together with the rotating member 5 to generate an operating load. Therefore, as illustrated in FIGS. 26, 27A and 27B, the operating load generating unit 12 includes a displacement unit 13 which is displaced in response to the rotational operation of the throttle lever 2 in the reverse direction β and an urging unit 14 which generates an urging force in response to the displacement of the displacement unit 13.

The displacement unit 13 includes a member extending in an arc shape along the rotation direction of the mounting member 6. The displacement unit 13 includes an accommodation recess portion 13a accommodating the urging unit 14, the pressed portion 13b protruding laterally, and a protruding portion 13c protruding upward. The urging unit 14 includes a coil spring extending in an arc shape and is accommodated in the accommodation recess portion 13a formed in an arc shape. Further, as illustrated in FIG. 28, the mounting member 6 has an insertion groove 6f formed in an arc shape. When the displacement unit 13 to which the urging unit 14 is attached is attached to the mounting groove portion 6e of the mounting member 6, the protruding portion 13c is inserted into the insertion groove 6f formed in the mounting member 6.

Then, when the throttle lever 2 is operated in the reverse direction β and the integrated component Y rotates in the same direction, and further the mounting member 6 rotates in the reverse direction β, as illustrated in FIG. 19, the pressed portion 13b of the displacement unit 13 abuts on the third fixing portion 1f, and thus the displacement unit 13 is displaced (see the alternate long and short dash line in FIG. 28) relative to the mounting member 6 and the urging unit 14 is compressed. As a result, when the throttle lever 2 is rotated in the reverse direction β, a predetermined operating load can be generated by the urging force of the urging unit 14. When the displacement unit 13 is displaced with respect to the mounting member 6, the protruding portion 13c of the displacement unit 13 moves along the insertion groove 6f, so that stable displacement can be performed.

On the other hand, when the throttle lever 2 is operated in the forward direction α and the integrated component Y rotates in the same direction, and further the mounting member 6 rotates in the forward direction α, the displacement unit 13 and the urging unit 14 rotate following the mounting member 6, and thus the displacement (relative displacement) is not performed with respect to the mounting member 6 and the urging unit 14 is not compressed. As a result, when the throttle lever 2 is rotated in the forward direction α, the urging force of the urging unit 14 is not generated and the operating load due to the operating load generating unit 12 is not generated. When the throttle lever 2 is operated in the forward direction α, the operating load due to the operating load generating unit 12 is not generated, but as described above, the operating load due to the urging force of the return spring S is generated.

Further, in the present embodiment, the throttle operating device includes the return spring S which urges the throttle lever 2 to the initial position when the throttle lever 2 is rotated in the forward direction α and the reverse direction β. Therefore, when the throttle lever 2 is rotated in the reverse direction β, both the urging force due to the return spring S and the operating load due to the operating load generating unit 12 are generated at the same time. That is, when the throttle lever 2 is rotated in the reverse direction β, the urging force due to the return spring S and the operating load due to the operating load generating unit 12 are added and the combined force thereof is applied as the operating load.

According to the present embodiment, the throttle lever 2 can be rotated in the forward direction α and the reverse direction β. Also, it is possible to control the drive source (engine) of the vehicle when the throttle lever 2 is rotated in the forward direction α, and it is possible to operate a predetermined device mounted on the vehicle or stop the operation of the predetermined device when the throttle lever 2 is rotated in the reverse direction β. Therefore, by rotating the throttle lever 2, it is possible to smoothly operate other devices possessed by the vehicle in addition to the throttle control.

In particular, in the throttle lever 2 according to the present embodiment, the operating load in the reverse direction β is set to be larger than the operating load in the forward direction α. Therefore, when operating the throttle lever 2 in the forward direction α, it is possible to prevent an accidental operation in the reverse direction β. Further, according to the present embodiment, the throttle operating device includes the operating load generating unit 12 which generates a predetermined operating load when the throttle lever 2 is rotated in the reverse direction β and does not generate an operating load when the throttle lever 2 is rotated in the forward direction α. Therefore, the operating load in the reverse direction β in the throttle lever 2 can be set to be larger than the operating load in the forward direction α.

Further, since the operating load generating unit 12 can rotate together with the rotating member 5 and generate an operating load, the operating load can be reliably generated when the throttle lever 2 is operated in the reverse direction β. Furthermore, the operating load generating unit 12 according to the present embodiment includes the displacement unit 13 which is displaced in response to the rotational operation of the throttle lever 2 in the reverse direction β and the urging unit 14 which generates an urging force in response to the displacement of the displacement unit 13. Therefore, when operating the throttle lever 2 in the reverse direction β, the operating load can be reliably and smoothly generated.

In addition, according to the present embodiment, the throttle operating device includes the return spring S which urges the throttle lever 2 to the initial position when the throttle lever 2 is rotated in the forward direction α and the reverse direction β, and the urging force due to the return spring S and the operating load due to the operating load generating unit 12 are generated when the throttle lever 2 is rotated in the reverse direction β. Therefore, when the throttle lever 2 is operated in the reverse direction β, a relatively large drag force (combined operating load) can be generated by adding the operating load generated by the operating load generating unit 12 and the urging force generated by the return spring S.

Hereinafter, a throttle operating device according to a third embodiment of the present disclosure will be described.

As similar to that of the first embodiment, the throttle operating device according to the third embodiment is fixed to a handlebar of a vehicle such as an ATV or a buggy, a ship such as a PWC (personal watercraft), or a vehicle such as a snow vehicle (in the present embodiment, a ship such as a PWC) so that an engine (drive source) of the ship can be controlled. As illustrated in FIGS. 29 to 34, the throttle operating device is configured to include a first fixing member 15a, a second fixing member 15b, a throttle lever 16, a holding case 18, a detection sensor 20, a return spring S, a first cover part 25, and a second cover part 26.

The first fixing member 15a and the second fixing member 15b are fixed to the vicinity of the grip formed at the tip of the handlebar H in a ship such as a PWC. A notch 15aa having an arc shape formed in the first fixing member 15a and a notch 15ba having an arc shape formed in the second fixing member 15b are bolted to each other while matching the notch 15aa and the notch 15ba with an outer peripheral surface of the handlebar H, in such a manner that the first fixing member 15a and the second fixing member 15b are fixed to handlebar H.

Figure 34:
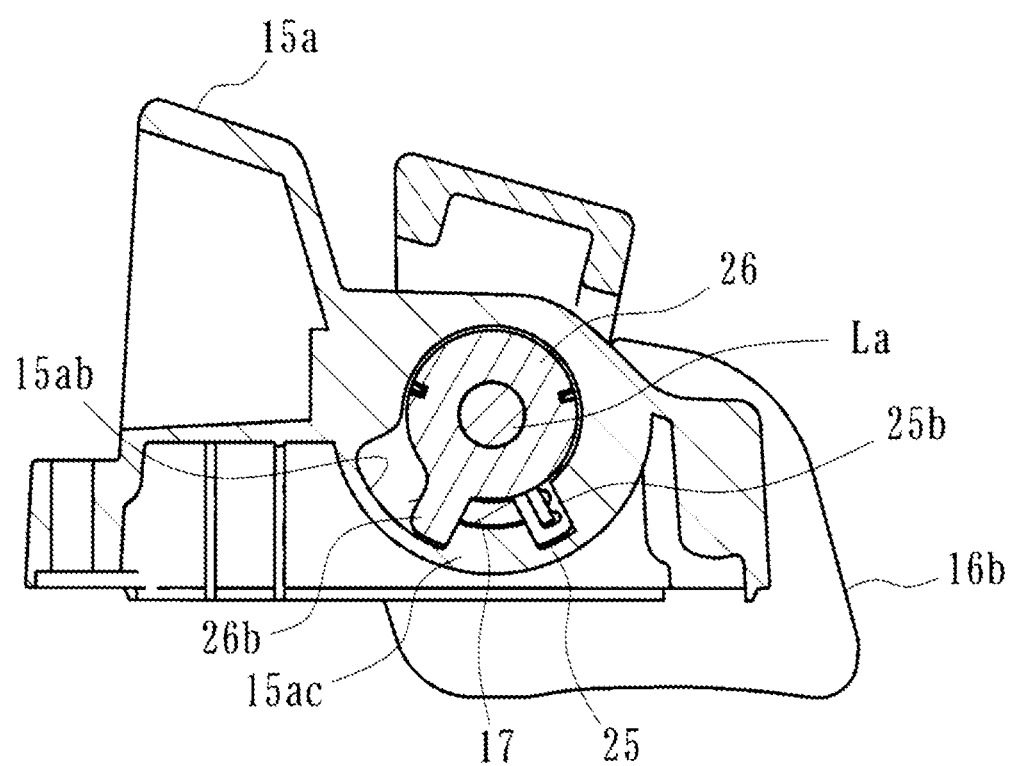
FIG. 34 is a cross-sectional view taken along the line XXXIV-XXXIV of FIG. 31.
Figure 37:
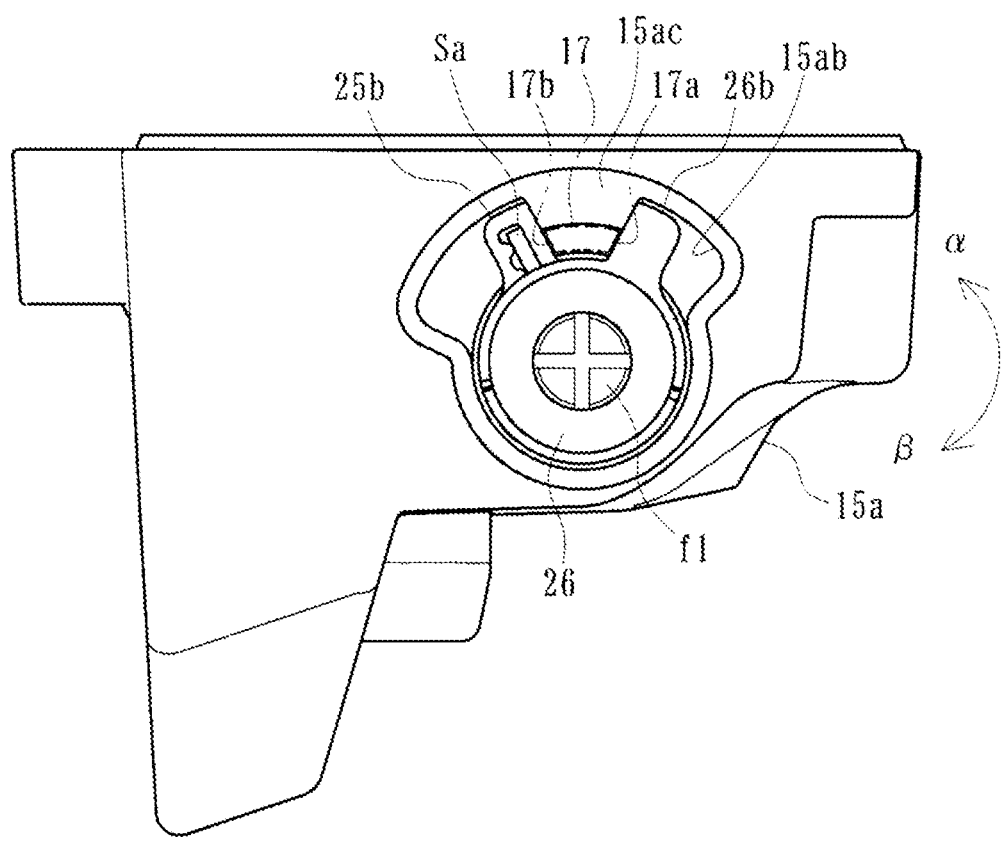
FIG. 37 is a side view illustrating an assembled state of the first cover part and the second cover part in the throttle operating device.

The second fixing member 15b has an operation switch D formed on a front side thereof, and by operating the operation switch D, various electrical components provided on the ship can be operated. The throttle lever 16 is pivotally attached to the first fixing member 15a and an opening portion 15ab is formed at a predetermined position. As illustrated in FIGS. 34 and 37, the opening portion 15ab is formed so as to penetrate a wall surface of the first fixing member 15a and a bulging portion 15ac protruding inward is formed in a part of a peripheral edge portion.

Figure 30:
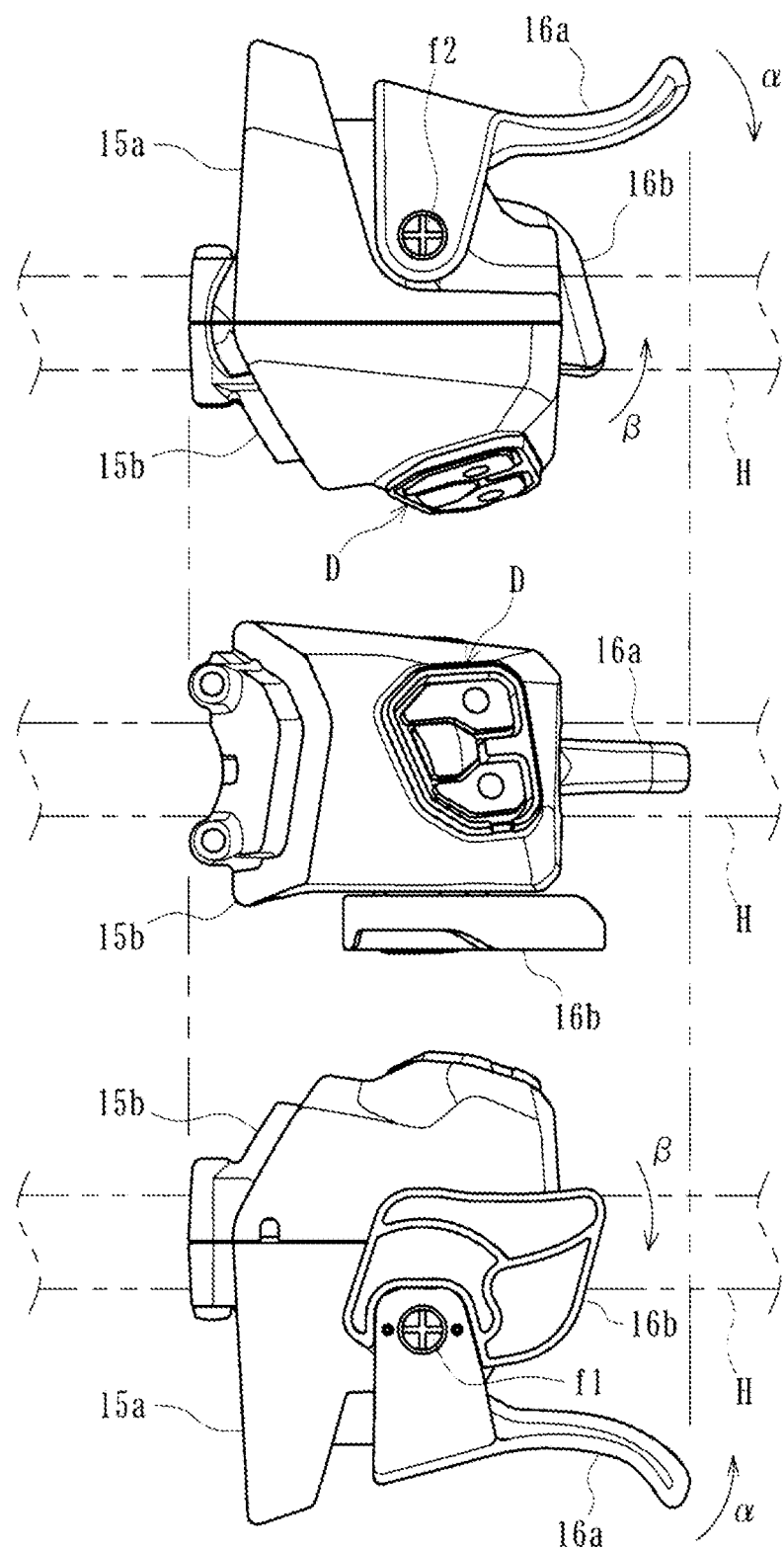
FIG. 30 is a three-view orthographic projection illustrating the throttle operating device.
Figure 31:
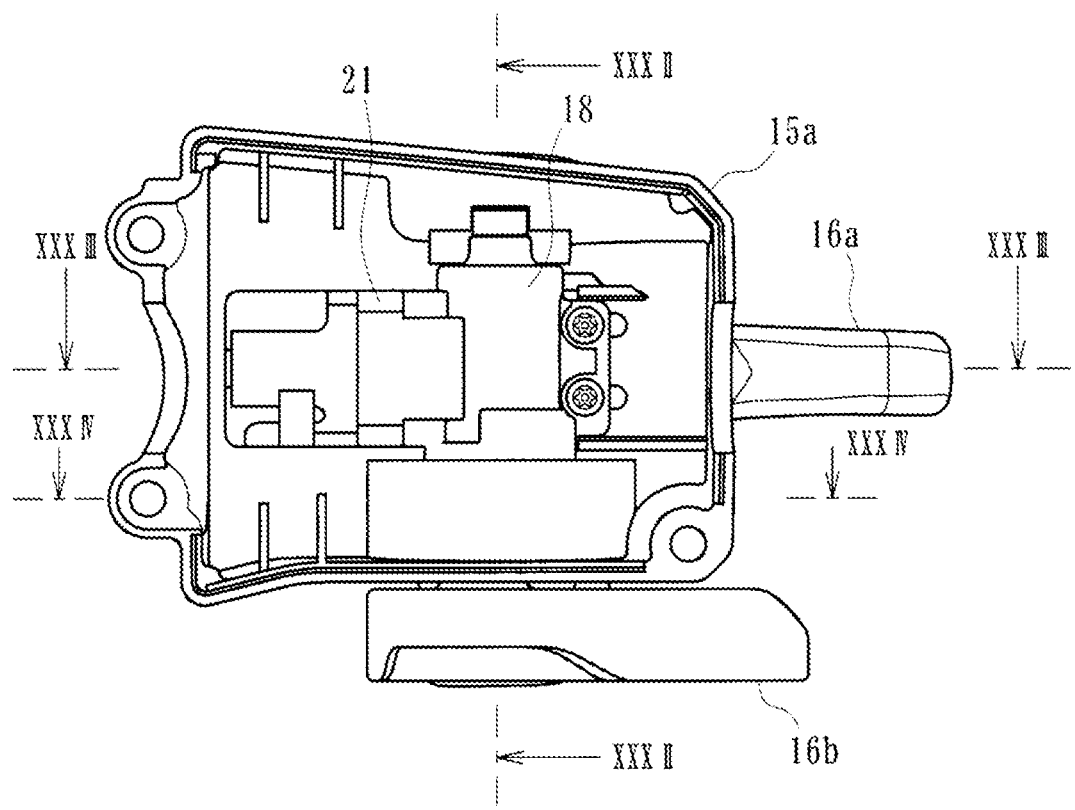
FIG. 31 is a plan view illustrating a state in which a second fixing member of the throttle operating device is removed.
Figure 35A:
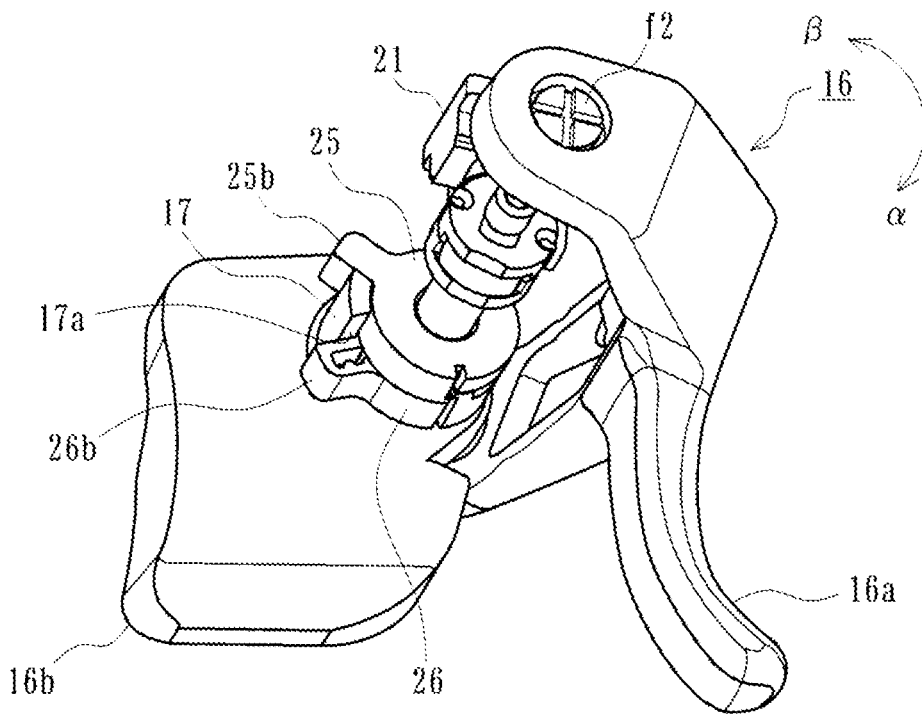
FIGS. 35A and 35B are perspective views illustrating a connected state of a throttle lever, a first cover part, and a second cover part in the throttle operating device.

The throttle lever 16 is attached and extending from the first fixing member 15a and can be rotated while gripping the grip. In the present embodiment, the throttle lever 16 is configured by including a first operating lever portion 16a and a second operating lever portion 16b. Specifically, as illustrated in FIGS. 35A to 36, the throttle lever 16 according to the present embodiment is configured by connecting the first operating lever portion 16a and the second operating lever portion 16b. As illustrated in FIG. 30, the first operating lever portion 16a can be pivoted in the forward direction α by pulling the first operating lever portion 16a toward a driver with an index finger or the like and the second operating lever portion 16b can be pivoted in the reverse direction β by pressing the second operating lever portion 16b with a thumb or the like.

Figure 32:
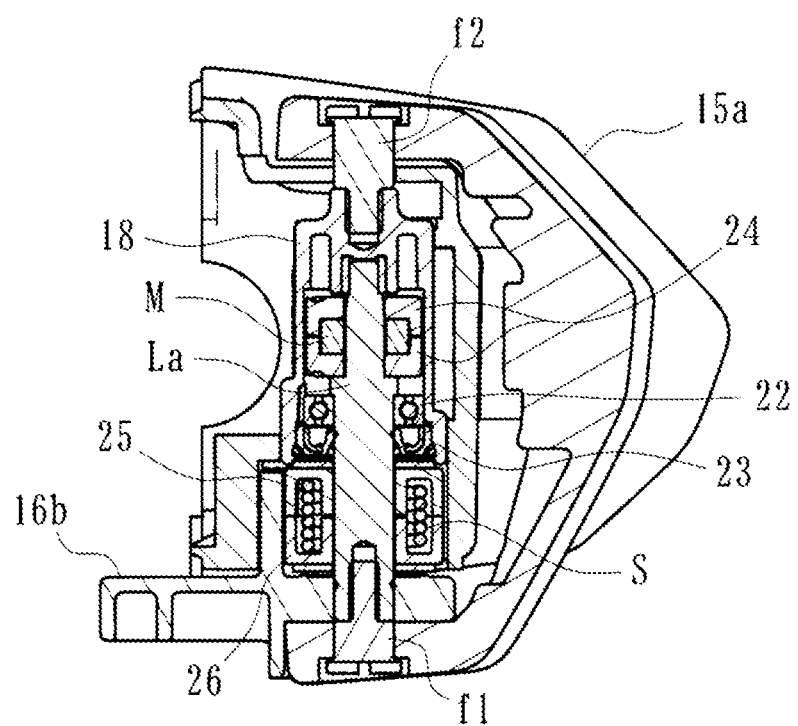
FIG. 32 is a cross-sectional view taken along the line XXXII-XXXII of FIG. 31.

Further, a shaft support member f2 is attached to a pivot center position of the first operating lever portion 16a and a shaft support member f1 is attached to a pivot center position of the second operating lever portion 16b. As illustrated in FIG. 32, a shaft member La is coaxially attached between the shaft support members f1 and f2. The shaft member La includes a shaft-shaped member which rotates with the rotational operation of the throttle lever 16. The shaft member La is attached to the inside of the holding case 18 fixed to the inside of the first fixing member 15a and can rotate around an axis in response to the rotational operation of the throttle lever 16.

However, the magnet M is fixed at a predetermined position of the shaft member La. The magnet M is attached to the shaft member La while being held by a holding member 24 and is made rotatable together with the shaft member La when the throttle lever 16 is rotated. The holding case 18 is provided with a bearing 22 which allows the shaft member La to smoothly rotate with respect to the holding case 18 and a sealing member 23 for preventing water or foreign matter from entering the holding case 18.

Figure 33:
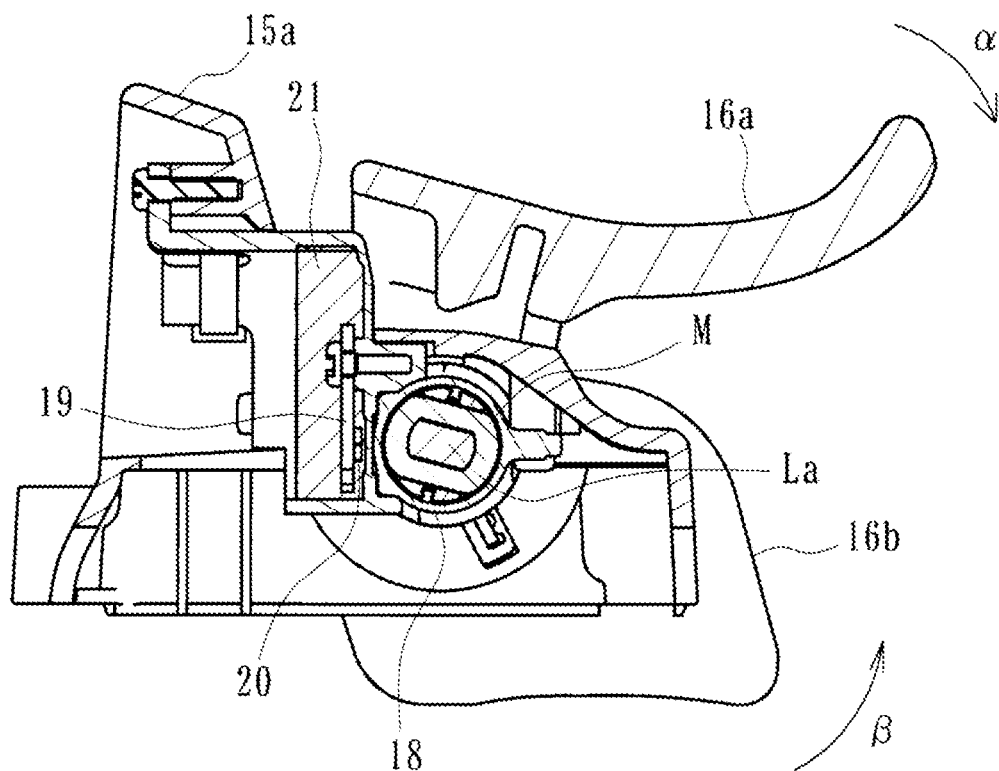
FIG. 33 is a cross-sectional view taken along the line XXXIII-XXXIII of FIG. 31.

Further, a sensor case 21 to which the detection sensor 20 is attached is fixed at a predetermined position of the first fixing member 15a. As illustrated in FIG. 33, the detection sensor 20 is formed on a substrate 19 and can detect a rotational operation angle of the throttle lever 16. In the present embodiment, the detection sensor 20 is composed of an angle sensor which detects a magnetic change of the magnet M and detects the rotation angle thereof. That is, when the magnet M rotates with the rotational operation of the throttle lever 16, the detection sensor 20 can detect the magnetic change of the magnet M due to the rotation and detect the rotational operation angle of the throttle lever 16.

Then, when the detection sensor 20 detects the rotational operation angle of the throttle lever 16, the detection signal is transmitted to an engine control unit (ECU) of the ship, a predetermined device mounted on the ship, or the like via a wiring connected to the substrate 19. Then, control of the engine (drive source) of the ship or operation (for example, reverse movement of the ship) of a predetermined device of the ship is performed based on the rotational operation angle of the throttle lever 16.

That is, in the throttle operating device according to the present embodiment, as illustrated in FIGS. 30 and 33, the throttle lever 16 can be rotated in the forward direction α and the reverse direction β with respect to the first fixing member 15a and the second fixing member 15b and the detection sensor 20 is attached at a position corresponding to the magnet M and can detect the rotational operation of the throttle lever 16 in the forward direction α and the reverse direction β. Then, the engine (drive source) of the ship can be controlled by the rotational operation of the throttle lever 16 in the forward direction α and reverse members (switching members called reverse gates, reverse buckets, or the likes which change a direction of the jet pump's jet) mounted on the ship can be operated by the rotational operation of the throttle lever 16 in the reverse direction β.

Figure 38:
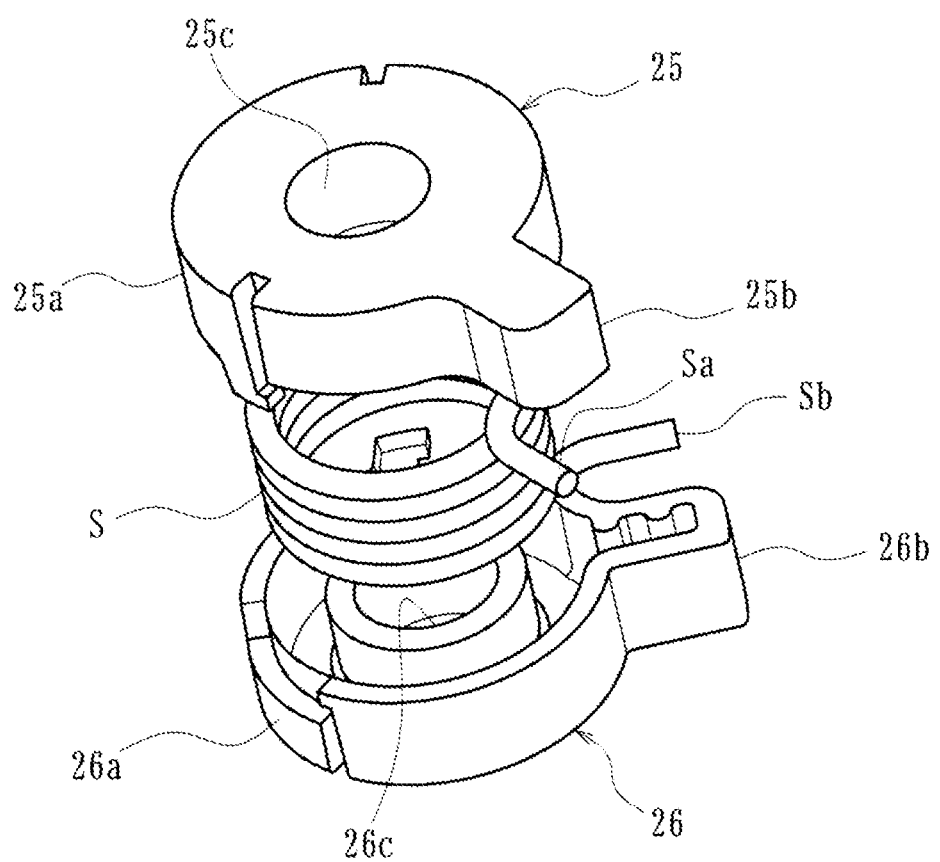
FIG. 38 is an exploded perspective view illustrating the first cover part and the second cover part in the throttle operating device.
Figure 39:
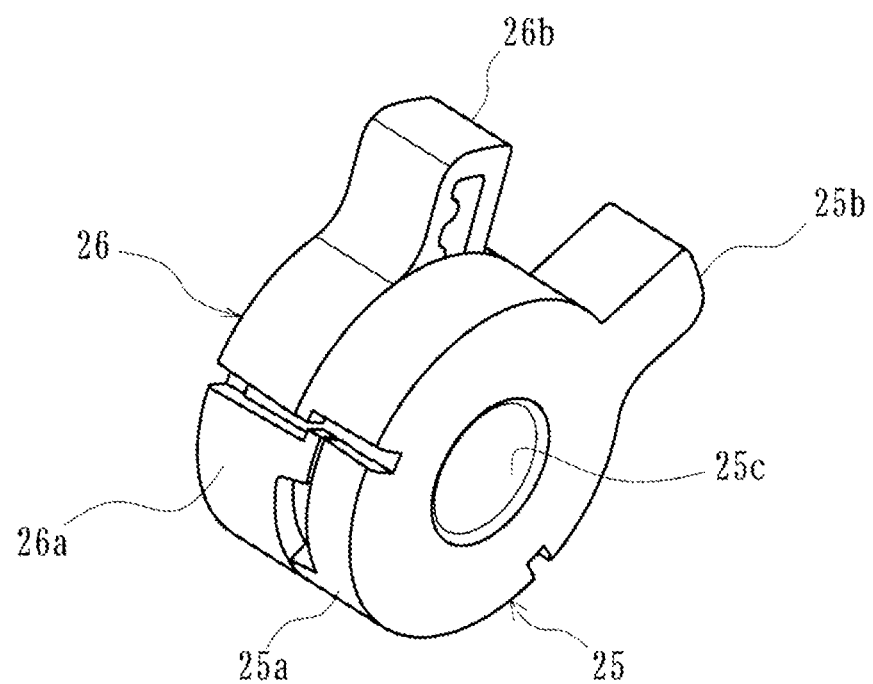
FIG. 39 is a perspective view illustrating the first cover part, the second cover part, and a return spring in the throttle operating device.
Figure 40:
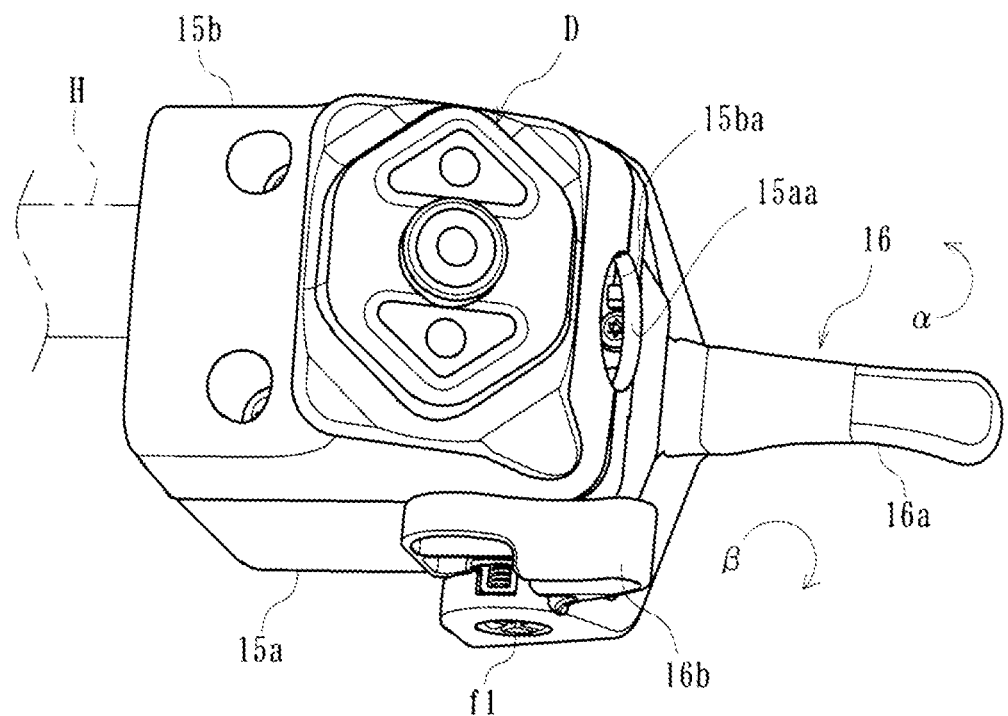
FIG. 40 is a perspective view illustrating a throttle operating device according to a fourth embodiment of the present disclosure.
Figure 41:
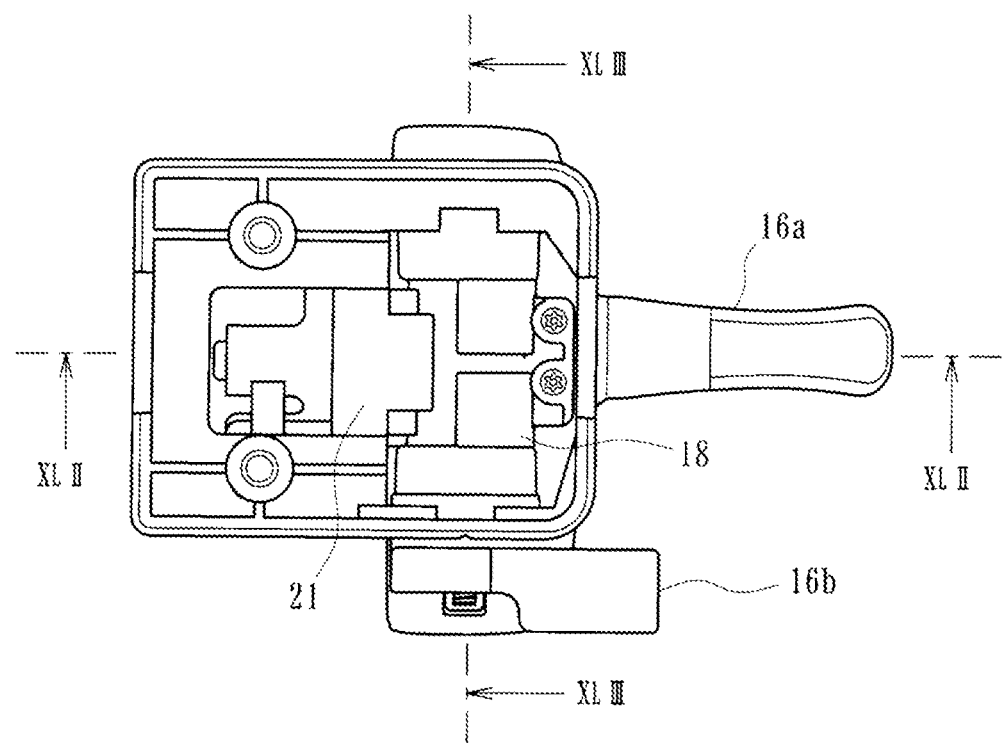
FIG. 41 is a plan view illustrating a state in which a second fixing member of the throttle operating device is removed.

Here, as illustrated in FIG. 32, the shaft member La according to the present embodiment is provided with a return spring S which urges the throttle lever 16 to an initial position when the throttle lever 16 is rotated (during the rotational operation in the forward direction α and the reverse direction β). As illustrated in FIGS. 38 and 39, the return spring S according to the present embodiment is composed of a torsion coil spring having one end Sa and the other end Sb. One end Sa side is covered with the first cover part 25 and the other end Sb side is covered with the second cover part 26.

The first cover part 25 is composed of a resin member having a main body portion 25a covering a coil portion (coil portion on one end Sa side) of the return spring S, a protruding portion 25b covering one end Sa of the return spring S, and a central hole 25c penetrating a center of the main body portion 25a. Also, the second cover part 26 is composed of a resin member having a main body portion 26a covering a coil portion (coil portion on the other end Sb side) of the return spring S, a protruding portion 26b covering the other end Sb of the return spring S, and a central hole 26c penetrating a center of the main body portion 25a.

Figure 35B:
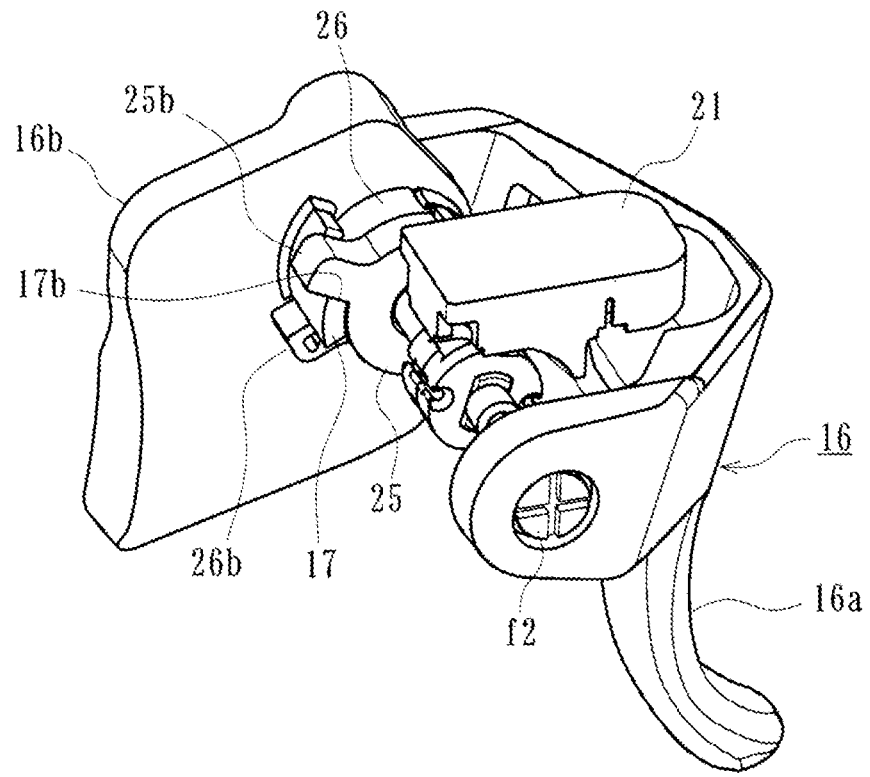
Figure 36:
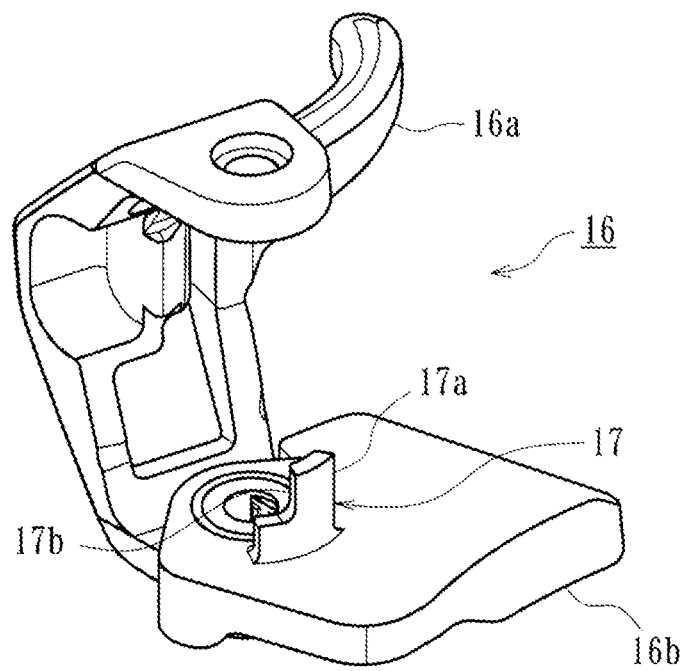
FIG. 36 is a perspective view illustrating an operating portion formed on the throttle lever (second throttle lever portion) in the throttle operation device.

Then, as illustrated in FIG. 39, the first cover part 25 and the second cover part 26 are brought into a matched state, and as illustrated in FIGS. 35A and 35B, the first cover part 25 and the second cover part 26 are attached to the shaft member La. As a result, the first cover part 25 and the second cover part 26 are independently pivotable in response to the movement of one end Sa and the other end Sb of the return spring S. That is, the protruding portion 26b of the second cover part 26 is pivoted while the protruding portion 25b of the first cover part 25 is fixed, or the protruding portion 25b of the first cover part 25 is pivoted while the protruding portion 26b of the second cover part 26 is fixed, in such a manner that the return spring S can generate an urging force.

Further, as illustrated in FIG. 36, the throttle lever 16 (second operating lever portion 16b in the present embodiment) is integrally formed with an operating portion 17 having a first pressing surface 17a and a second pressing surface 17b. As illustrated in FIGS. 34 and 37, the operating portion 17 is located between (in the present embodiment, between the protruding portion 25b of the first cover part 25 and the protruding portion 26b of the second cover part 26) one end Sa and the other end Sb of the return spring 16 and is rotatable in response to the rotational operation of the throttle lever 16.

The second pressing surface 17b of the operating portion 17 according to the present embodiment is composed of an edge surface of a notch formed in the operating portion 17. As illustrated in FIGS. 35A and 35B, the operating portion 17 is assembled such that the second pressing surface 17b abuts on the protruding portion 26b of the second cover part 26 and the first pressing surface 17a abuts on the protruding portion 25b of the first cover part 25. As illustrated in FIGS. 34 and 37, the bulging portion 15ac described above is formed in the opening portion 15ab of the first fixing member 15a and, in addition to the operating portion 17, the bulging portion 15ac is located between the protruding portion 25b of the first cover part 25 and the protruding portion 26b of the second cover part 26.

Then, when the first operating lever portion 16a in the throttle lever 16 is rotated in the forward direction α, the operating portion 17 pivots in the forward direction α and the first pressing surface 17a presses the protruding portion 25b of the first cover part 25, and thus the first cover part 25 pivots on the shaft member La. At the same time, the protruding portion 26b of the second cover part 26 interferes with the bulging portion 15ac and pivoting of the second cover part 26 is restricted. Further, when the second operating lever portion 16b in the throttle lever 16 is rotated in the reverse direction β, the operating portion 17 pivots in the reverse direction β and the second pressing surface 17b presses the protruding portion 26b of the second cover part 26, and thus the second cover part 26 pivots on the shaft member La. At the same time, the protruding portion 25b of the first cover part 25 interferes with the bulging portion 15ac and pivoting of the first cover part 25 is restricted.

Therefore, according to the present embodiment, when the throttle lever 16 is rotated in the forward direction α by the rotational operation of the first throttle lever 16a, one end Sa is pressed and pivoted by the operating portion 17 while the other end Sb of the return spring S is fixed, so that an urging force can be obtained. Also, when the throttle lever 16 is rotated in the reverse direction β by the rotational operation of the second throttle lever 16b, the other end Sb is pressed and pivoted by the operating portion 17 while one end Sa of the return spring S is fixed, so that an urging force can be obtained.

In the present embodiment, the second pressing surface 17b is composed of the edge surface of the notch formed in the operating portion 17. However, at least one of the first pressing surface 17a and the second pressing surface 17b may be composed of the edge surface of the notch formed in the operating portion 17. For example, the first pressing surface 17a may be composed of the edge surface of the notch formed in the operating portion 17, or both the first pressing surface 17a and the second pressing surface 17b may be composed of the edge surfaces of the notch formed in the operating portion 17. Further, a notch may not be formed in the operating portion 17 and both edge surfaces thereof may be the first pressing surface 17a and the second pressing surface 17b.

According to the present embodiment, the throttle lever 16 can be rotated in the forward direction α and the reverse direction β and the drive source (engine) of the ship can be controlled by the rotational operation in the forward direction α, and further it is possible to operate or stop the operation of a predetermined device (reverse member) mounted on the ship by the rotational operation in the reverse direction β. Therefore, by rotating the throttle lever 16, in addition to the throttle control, other devices of the ship can be smoothly operated.

Further, when the throttle lever 16 is rotated in the forward direction α, one end Sa is pressed and pivoted by the operating portion 17 while the other end Sb of the return spring S is fixed, so that an urging force can be obtained. Also, when the throttle lever 16 is rotated in the reverse direction, the other end Sb is pressed and pivoted by the operating portion 17 while one end Sa of the return spring S is fixed, so that an urging force can be obtained. Therefore, when the throttle lever 16 is rotated in the forward direction α and the reverse direction β, the urging force can be smoothly obtained by the single return spring S.

Further, the throttle operating device includes the first cover part 25 which covers one end Sa side of the return spring S and the second cover part 26 which covers the other end Sb side of the return spring S and the operating portion 17 can be pivoted by pressing the first cover part 25 or the second cover part 26 according to the rotation direction of the throttle lever 16. Therefore, it is possible to stably obtain the urging force due to the return spring S when the throttle lever 16 is rotated in the forward direction α and the reverse direction β.

Furthermore, the operating portion 17 has the first pressing surface 17a which presses the first cover part 25 (protruding portion 25b) and the second pressing surface 17b which presses the second cover part 26 (protruding portion 26b) and at least one of the first pressing surface 17a and the second pressing surface 17b is composed of the edge surface of the notch formed in the operating portion 17. Therefore, by appropriately determining a width dimension of the notch, a separation dimension between the first pressing surface 17a and the second pressing surface 17b can be adjusted, and thus the first pressing surface 17a and the second pressing surface 17b can be set according to the initial positions of one end Sa and the other end Sb of the return spring S.

Hereinafter, a throttle operating device according to a fourth embodiment of the invention will be described.

As similar to that of the third embodiment, the throttle operating device according to the fourth embodiment is fixed to a handlebar of a vehicle such as an ATV or a buggy, a ship such as a PWC (personal watercraft), or a vehicle such as a snow vehicle (in the present embodiment, a ship such as a PWC) so that an engine (drive source) of the ship can be controlled. As illustrated in FIGS. 40 to 44, the throttle operating device is configured to include the first fixing member 15a, the second fixing member 15b, the throttle lever 16, the holding case 18, the detection sensor 20, return springs (S1, S2), and a neutral position holding unit 27. Except for parts described separately in the present embodiment, the parts common to those of the third embodiment are designated by the same reference numerals and letters and detailed description thereof will be omitted.

As similar to that of the third embodiment, the throttle lever 16 is configured by connecting the first operating lever portion 16a and the second operating lever portion 16b. The first operating lever portion 16a can be pivoted in the forward direction α by pulling the first operating lever portion 16a toward a driver with an index finger or the like and the second operating lever portion 16b can be pivoted in the reverse direction β by pressing the second operating lever portion 16b with a thumb or the like. The operation switch D is formed on a front side of the second fixing member 15b as in the third embodiment. By operating the operation switch D, various electrical components provided on the ship can be operated.

Figure 43:
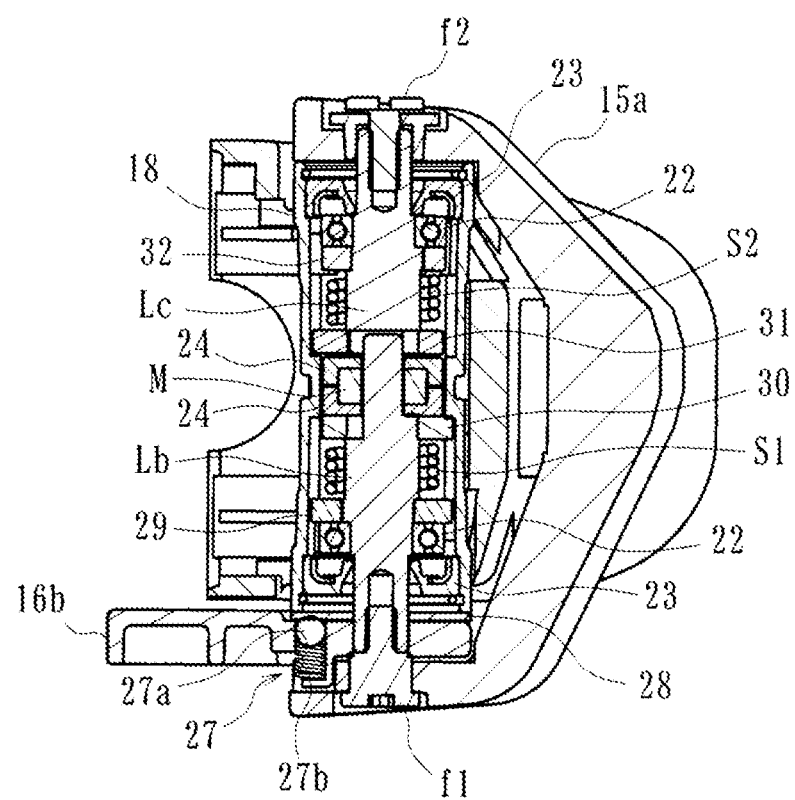
FIG. 43 is a cross-sectional view taken along the line XLIII-XLIII of FIG. 41.

Further, the shaft support member f2 is attached to the pivot center position of the first operating lever portion 16a and the shaft support member f1 is attached to the pivot center position of the second operating lever portion 16b. As illustrated in FIG. 43, shaft members Lb and Lc are coaxially connected and attached between the shaft support members f1 and f2. The shaft members Lb and Lc are composed of shaft-shaped members which rotate with the rotational operation of the throttle lever 16. The shaft members Lb and Lc are attached to the inside of the holding case 18 fixed to the inside of the first fixing member 15a and can rotate around an axis in response to the rotational operation of the throttle lever 16.

However, the magnet M is fixed at a predetermined position of the shaft member Lb. The magnet M is attached to the shaft member Lb while being held by the holding member 24 and is made rotatable together with the shaft member Lb when the throttle lever 16 is rotated. The holding case 18 is provided with two bearings 22 which allow the shaft member La and the shaft member Lc to smoothly rotate with respect to the holding case 18 and two sealing members 23 for preventing water or foreign matter from entering the holding case 18.

Figure 42:
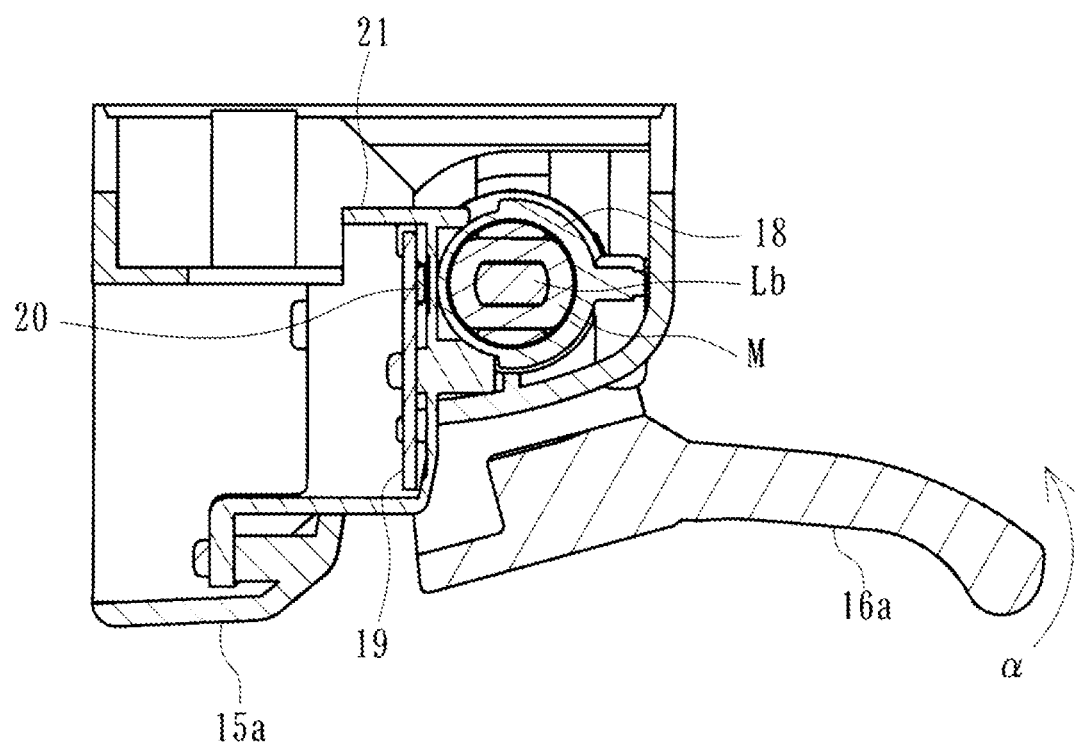
FIG. 42 is a cross-sectional view taken along the line XLII-XLII of FIG. 41.

As illustrated in FIG. 42, the detection sensor 20 is formed on the substrate 19 and can detect the rotational operation angle of the throttle lever 16. Similar to that of the third embodiment, the detection sensor 20 is composed of an angle sensor which detects a magnetic change of the magnet M and detects the rotation angle thereof. That is, when the magnet M rotates with the rotational operation of the throttle lever 16, the detection sensor 20 can detect the magnetic change of the magnet M due to the rotation and detect the rotational operation angle of the throttle lever 16.

Then, when the detection sensor 20 detects the rotational operation angle of the throttle lever 16, the detection signal is transmitted to the engine control unit (ECU) of the ship, the predetermined device mounted on the ship, or the like via the wiring connected to the substrate 19. Then, control of the engine (drive source) of the ship or operation (for example, reverse movement of the ship) of the predetermined device of the ship is performed based on the rotational operation angle of the throttle lever 16.

That is, in the throttle operating device according to the present embodiment, as similar to that of the third embodiment, the throttle lever 16 can be rotated in the forward direction α and the reverse direction β with respect to the first fixing member 15a and the second fixing member 15b and the detection sensor 20 is attached at a position corresponding to the magnet M and can detect the rotational operation of the throttle lever 16 in the forward direction α and the reverse direction β. Then, the engine (drive source) of the ship can be controlled by the rotational operation of the throttle lever 16 in the forward direction α and reverse members (switching members called reverse gates, reverse buckets, or the likes which change a direction of the jet pump's jet) mounted on the ship can be operated by the rotational operation of the throttle lever 16 in the reverse direction β.

Figure 44:
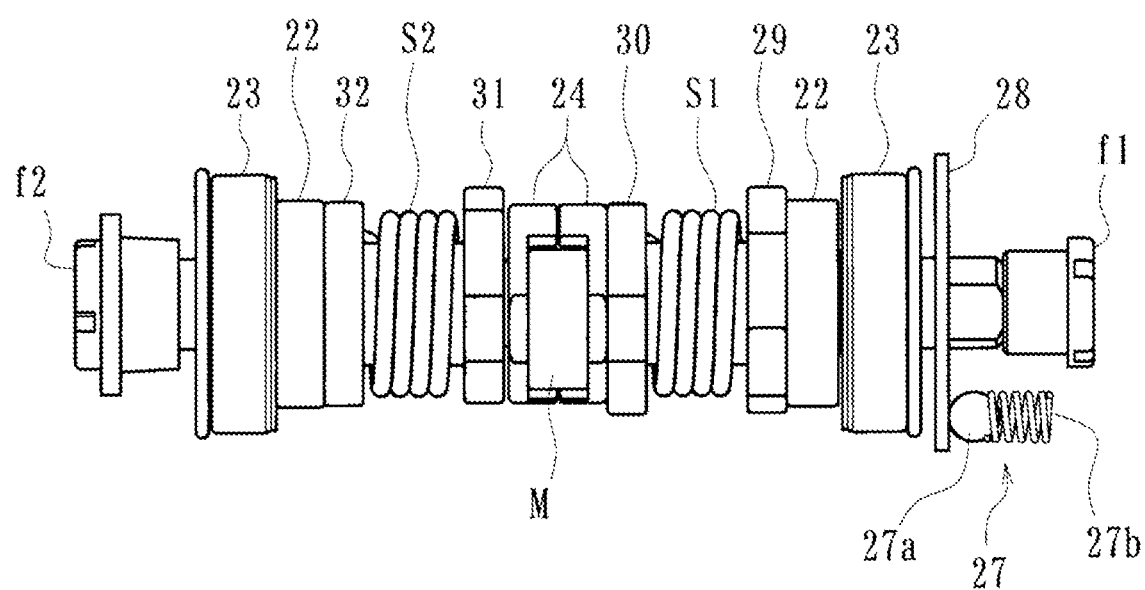
FIG. 44 is a side view illustrating a component attached to a shaft member and a neutral position holding unit in the throttle operating device.

Here, as illustrated in FIGS. 43 and 44, the return spring S1 for forward rotation which urges the throttle lever 16 to the initial position when the throttle lever 16 is rotated in the forward direction α and the return spring S2 for reverse rotation which urges the throttle lever 16 to the initial position when the throttle lever 16 is rotated in the reverse direction β are respectively attached to the shaft members Lb and Lc according to the present embodiment.

Further, the return spring S1 for forward rotation and the return spring S2 for reverse rotation are respectively disposed at positions (positions where the return spring S1 for forward rotation is on one side of the magnet M and the return spring S2 for reverse rotation is on the other side) sandwiching the magnet M. Further, in the return spring S1 for forward rotation according to the present embodiment, one end is attached to a disk-shaped member 29 and the other end is attached to a disk-shaped member 30. Also, in the return spring S2 for reverse rotation, one end is attached to a disk-shaped member 31 and the other end is attached to a disk-shaped member 32.

Then, when the first operating lever portion 16a in the throttle lever 16 is rotated in the forward direction α, one of the disk-shaped member 29 and the disk-shaped member 30 is locked and fixed to the holding case 18 and the other is locked to the shaft member (Lb and Lc) and rotated. As a result, an urging force due to the return spring S1 for forward rotation can be obtained. In this case, the shaft member Lc is not locked to the disk-shaped member 31 and the disk-shaped member 32 and runs idle, so that an urging force due to the return spring S2 for reverse rotation cannot be obtained.

On the other hand, when the second operating lever portion 16b in the throttle lever 16 is rotated in the reverse direction β, one of the disk-shaped member 31 and the disk-shaped member 32 is locked and fixed to the holding case 18 and the other is locked to the shaft member (Lb and Lc) and rotated. As a result, an urging force due to the return spring S2 for reverse rotation can be obtained. In this case, the shaft member Lb is not locked to the disk-shaped member 29 and the disk-shaped member 30 and runs idle, so that an urging force due to the return spring S1 for forward rotation cannot be obtained.

Further, in the present embodiment, the neutral position holding unit 27 which holds the shaft member (Lb and Lc) in a neutral position is attached. The neutral position holding unit 27 includes a spherical member 27a and a coil spring 27b and is assembled in a state where the spherical member 27a urged by the coil spring 27b is pressed against a rotating plate member 28 attached to the shaft member Lb. Then, in a state where the throttle lever 16 is not rotated, the rotating plate member 28 is pressed by the spherical member 27a, so that the neutral positions of the shaft members Lb and Lc are held.

According to the present embodiment, the throttle lever 16 can be rotated in the forward direction α and the reverse direction β. Also, it is possible to control the drive source (engine) of the ship by rotating the throttle lever 16 in the forward direction α and it is possible to operate a predetermined device (reverse member) mounted on the ship or stop the operation of the device by rotating the throttle lever 16 in the reverse direction β. Therefore, by rotating the throttle lever 16, it is possible to smoothly operate other devices possessed by the ship in addition to the throttle control.

Further, the throttle operating device includes the shaft member (Lb and Lc) which is connected to the throttle lever 16 and rotates around the axis in response to the rotational operation of the throttle lever 16, the return spring S1 for forward rotation which is attached to the shaft member Lb and urges the throttle lever 16 to the initial position when the throttle lever 16 rotates in the forward direction α, and the return spring S2 for reverse rotation which is attached to the shaft member Lc and urges the throttle lever 16 to the initial position when the throttle lever 16 rotates in the reverse direction β. Therefore, the urging force when the throttle lever 16 is rotated in the forward direction α and the urging force when the throttle lever 16 is rotated in the reverse direction β can be appropriately set.

Further, the detection sensor 20 according to the present embodiment is configured to be able to detect the rotational operation of the throttle lever 16 in the forward direction α and the reverse direction β by detecting the change in the magnetic force of the magnet M attached to the shaft member (Lb and Lc) and the return spring S1 for forward rotation and the return spring S2 for reverse rotation are respectively disposed at the positions sandwiching the magnet M. Therefore, the rotation of the throttle lever 16 in the forward direction α and the reverse direction β can be stably performed.

Further, the neutral position holding unit 27 for holding the shaft member (Lb and Lc) in the neutral position is provided. Therefore, even when the urging forces of the return spring S1 for forward rotation and the return spring S2 for reverse rotation are different, the shaft member (Lb and Lc) can be reliably held in the neutral position. In the rotating plate member 28, a recess portion may be formed at a position where the spherical member 27a is pressed, so that the holding force at the neutral position may be increased.

Although the present embodiments are described above, the invention is not limited to this. For example, the form and assembly structure of the return spring S may be different as long as the throttle lever 2 can be rotated in the forward direction α and the reverse direction β. The resistance force applying unit 7 may be attached to a component (mounting member 6 or the like) different from the rotating member 5, or the resistance force applying unit 7 may not be provided. Further, although the sliding member K is made of a metal member, the sliding member K may be made of another material as long as the sliding of the resistance force applying unit 7 can generate friction to apply the resistance force. Also, the sliding member K may be attached to the cover member 3 by a method other than insert molding such as screwing. In addition, a separate sliding member K may not be provided, and for example, the lower surface 3b of the cover member 3 may be processed to be a sliding surface for the resistance force applying unit 7.

If the gist is the same as that of the invention, it can be applied to those having a different appearance shape or those to which other functions are added.

According to an aspect of the present disclosure, there is provided a throttle operating device including: a fixing member which is fixed to a vicinity of a grip formed at a tip of a handlebar of a transport; a throttle lever which is attached and extending from the fixing member, and the throttle lever configured to be rotated while the grip is gripped; and a detection sensor which is disposed on the fixing member and is configured to detect a rotational operation angle of the throttle lever. A drive source of the transport is configured to be controlled based on the rotational operation angle of the throttle lever detected by the detection sensor. The throttle lever is configured to be rotated in a forward direction and a reverse direction. When the throttle lever is rotated in the forward direction, the drive source of the transport can be controlled. When the throttle lever is rotated in the reverse direction, a predetermined device mounted on the transport can be operated or an operation of the predetermined device can be stopped.

According to the above aspect of the present disclosure, the throttle lever is configured to be rotated in the forward direction and the reverse direction. Also, it is possible to control a drive source of the transport when the throttle lever is rotated in the forward direction and it is possible to operate a predetermined device mounted on the transport or stop the operation of the predetermined device when the throttle lever is rotated in the reverse direction. Therefore, by rotating the throttle lever, it is possible to smoothly operate other devices of the transport in addition to the throttle control.

The throttle operating device may further includes a shaft member which is connected to the throttle lever and rotates around an axis in response to a rotational operation of the throttle lever, and a magnet which is attached to the shaft member. The detection sensor may be attached at a position corresponding to the magnet, be configured to detect the rotational operation angle of the throttle lever based on a magnetic change of the magnet rotating in response to the throttle lever, and be configured to detect the rotational operation of the throttle lever in the forward direction and the reverse direction.

According to the above, the detection sensor is configured to detect the rotational operation angle of the throttle lever based on the magnetic change of the magnet rotating in response to the throttle lever. Also, the detection sensor is attached at the position corresponding to the magnet. Therefore, it is possible to accurately detect the rotational operation of the throttle lever in the forward direction and the reverse direction.

The throttle operating device may further include a rotating member which is connected to the shaft member and rotates in response to the rotational operation of the throttle lever, and a return spring which urges the throttle lever to an initial position when the throttle lever is rotated. A first locking portion configured to lock one end of the return spring and a second locking portion configured to lock the other end of the return spring are formed in the rotating member. When the throttle lever is rotated in the forward direction, the one end of the return spring is locked to the first locking portion and pivots in response to a rotation of the rotating member and the other end of the return spring is locked and fixed to the fixing member. When the throttle lever is rotated in the reverse direction, the other end of the return spring is locked to the second locking portion and pivots in response to the rotation of the rotating member and the one end of the return spring is locked and fixed to the fixing member.

According to the above, in the rotating member, the first locking portion configured to lock one end of the return spring and the second locking portion configured to lock the other end of the return spring are formed. In addition, when the throttle lever is rotated in the forward direction, the one end of the return spring is locked to the first locking portion and pivots in response to the rotation of the rotating member and the other end of the return spring is locked and fixed to the fixing member. Also, when the throttle lever is rotated in the reverse direction, the other end of the return spring is locked to the second locking portion and pivots in response to the rotation of the rotating member and the one end of the return spring is locked and fixed to the fixing member. Therefore, when the throttle lever is rotated in the forward direction and the reverse direction, the urging force due to one return spring can be smoothly and surely applied.

The fixing member has a second fixing portion which locks and fixes the other end of the return spring when the throttle lever is rotated in the forward direction, and a first fixing portion which locks and fixes the one end of the return spring when the throttle lever is rotated in the reverse direction. A clearance is provided between the one end of the return spring and the first fixing portion, or between the other end of the return spring and the second fixing portion.

According to the above, a clearance is provided between the one end of the return spring and the first fixing portion, or between the other end of the return spring and the second fixing portion. Therefore, at the start of the rotational operation of the throttle lever, it is possible to generate a rotation region (mechanical play region) in which the urging force due to the return spring is not applied.

The throttle operating device may further include a resistance force applying unit configured to generate friction during the rotational operation of the throttle lever in the forward direction and the reverse direction to apply a resistance force.

According to the above, the throttle operating device includes the resistance force applying unit configured to generate friction during the rotational operation of the throttle lever in the forward direction and the reverse direction to apply the resistance force. Therefore, it is possible to improve the operability when rotating the throttle lever.

A cover member covering an opening of the fixing member may be provided and the detection sensor is attached to the cover member at a position corresponding to the magnet.

According to the above, the cover member covering the opening of the fixing member is provided and the detection sensor is attached to the cover member. Therefore, the cover member has a function of covering the opening of the fixing member and a function of attaching the detection sensor, and it is possible to easily take waterproof measures for a portion to which the detection sensor is attached.

An operating load of the throttle lever in the reverse direction may be set to be larger than an operating load of the throttle lever in the forward direction.

According to claim 7, the operating load of the throttle lever in the reverse direction is set to be larger than the operating load of the throttle lever in the forward direction. Therefore, when operating the throttle lever in the forward direction, it is possible to prevent an accidental operation in the reverse direction.

The throttle operating device may further include an operating load generating unit which generates a predetermined operating load when the throttle lever is rotated in the reverse direction and does not generate the operating load when the throttle lever is rotated in the forward direction.

According to the above, the throttle operating device includes the operating load generating unit which generates a predetermined operating load when the throttle lever is rotated in the reverse direction and does not generate the operating load when the throttle lever is rotated in the forward direction. Therefore, the operating load in the reverse direction of the throttle lever can be set to be larger than the operating load in the forward direction.

The throttle operating device may further include a shaft member which is connected to the throttle lever and rotates around an axis in response to the rotational operation of the throttle lever, and a rotating member which is connected to the shaft member and rotates in response to the rotational operation of the throttle lever. The operating load generating unit may be configured to rotate together with the rotating member and generate the operating load.

According to the above, the operating load generating unit is configured to rotate together with the rotating member and generate the operating load. Therefore, the operating load can be reliably generated when the throttle lever is operated in the reverse direction.

The operating load generating unit may include a displacement unit which is displaced in response to the rotational operation of the throttle lever in the reverse direction, and an urging unit which generates an urging force in response to a displacement of the displacement unit.

According to the above, the operating load generating unit includes the displacement unit which is displaced in response to the rotational operation of the throttle lever in the reverse direction and the urging unit which generates the urging force in response to the displacement of the displacement unit. Therefore, when operating the throttle lever in the reverse direction, the operating load can be reliably and smoothly generated.

The throttle operating device may further include a return spring which urges the throttle lever to an initial position when the throttle lever is rotated in the forward direction and the reverse direction. An urging force due to the return spring and the operating load due to the operating load generating unit may be generated when the throttle lever is rotated in the reverse direction.

According to the above, the throttle operating device includes the return spring which urges the throttle lever to the initial position when the throttle lever is rotated in the forward direction and the reverse direction and the urging force due to the return spring and the operating load due to the operating load generating unit are generated when the throttle lever is rotated in the reverse direction. Therefore, when the throttle lever is operated in the reverse direction, a relatively large drag force can be generated by adding the operating load generated by the operating load generating unit and the urging force generated by the return spring.

The throttle operating device may further include a shaft member which is connected to the throttle lever and rotates around an axis in response to a rotational operation of the throttle lever, a return spring which is attached to the shaft member and urges the throttle lever to an initial position when the throttle lever is rotated, and an operating portion which is located between one end and the other end of the return spring and is configured to rotate in response to the rotational operation of the throttle lever. When the throttle lever is rotated in the forward direction, the one end of the return spring is pressed and pivoted by the operating portion while the other end of the return spring is fixed to obtain an urging force. When the throttle lever is rotated in the reverse direction, the other end of the return spring is pressed and pivoted by the operating portion while the one end of the return spring is fixed to obtain an urging force.

According to claim 12, when the throttle lever is rotated in the forward direction, the one end of the return spring is pressed and pivoted by the operating portion while the other end of the return spring is fixed to obtain an urging force. Also, when the throttle lever is rotated in the reverse direction, the other end of the return spring is pressed and pivoted by the operating portion while the one end of the return spring is fixed to obtain an urging force. Therefore, when the throttle lever is rotated in the forward direction and the reverse direction, the urging force can be smoothly obtained by the single return spring.

The throttle operating device may further include a first cover part which covers one end side of the return spring, and a second cover part which covers the other end side of the return spring. The operating portion may be configured to be pivoted by pressing the first cover part or the second cover part according to the rotation direction of the throttle lever.

According to the above, the throttle operating device includes the first cover part which covers one end side of the return spring and the second cover part which covers the other end side of the return spring and the operating portion is configured to be pivoted by pressing the first cover part or the second cover part according to the rotation direction of the throttle lever. Therefore, it is possible to stably obtain the urging force due to the return spring when the throttle lever is rotated in the forward direction and the reverse direction.

The operating portion may have a first pressing surface which presses the first cover part, and a second pressing surface which presses the second cover part. At least one of the first pressing surface and the second pressing surface may include an edge surface of a notch formed in the operating portion.

According to claim 14, the operating portion has the first pressing surface which presses the first cover part and the second pressing surface which presses the second cover part and at least one of the first pressing surface and the second pressing surface includes the edge surface of the notch formed in the operating portion. Therefore, by appropriately determining a width dimension of the notch, a separation dimension between the first pressing surface and the second pressing surface can be adjusted, and thus the first pressing surface and the second pressing surface can be set according to the initial positions of one end and the other end of the return spring.

The throttle operating device may further include a shaft member which is connected to the throttle lever and rotates around an axis in response to a rotational operation of the throttle lever, a return spring for forward rotation which is attached to the shaft member and urges the throttle lever to an initial position when the throttle lever rotates in the forward direction, and a return spring for reverse rotation which is attached to the shaft member and urges the throttle lever to the initial position when the throttle lever rotates in the reverse direction.

According to the above, the throttle operating device includes the shaft member which is connected to the throttle lever and rotates around the axis in response to the rotational operation of the throttle lever, the return spring for forward rotation which is attached to the shaft member and urges the throttle lever to the initial position when the throttle lever rotates in the forward direction, and the return spring for reverse rotation which is attached to the shaft member and urges the throttle lever to the initial position when the throttle lever rotates in the reverse direction. Therefore, the urging force when the throttle lever is rotated in the forward direction and the urging force when the throttle lever is rotated in the reverse direction can be appropriately set.

The detection sensor may be configured to detect the rotational operation of the throttle lever in the forward direction and the reverse direction by detecting a change in a magnetic force of a magnet attached to the shaft member. The return spring for forward rotation and the return spring for reverse rotation may be respectively disposed at positions sandwiching the magnet.

According to the above, the detection sensor is configured to detect the rotational operation of the throttle lever in the forward direction and the reverse direction by detecting the change in the magnetic force of the magnet attached to the shaft member and the return spring for forward rotation and the return spring for reverse rotation are respectively disposed at the positions sandwiching the magnet. Therefore, the rotation of the throttle lever in the forward direction and the reverse direction can be stably performed.

The throttle operating device may further include a neutral position holding unit which holds the shaft member in a neutral position.

According to the above, the neutral position holding unit for holding the shaft member in the neutral position is provided. Therefore, even when the urging forces of the return spring for forward rotation and the return spring for reverse rotation are different, the shaft member can be reliably held in the neutral position.

What is claimed is:

1. A throttle operating device comprising:
    a fixing member which is fixed to a vicinity of a grip formed at a tip of a handlebar of a transport;
    a throttle lever which is attached and extending from the fixing member, and the throttle lever configured to be rotated while the grip is gripped; and
    a detection sensor which is disposed on the fixing member and is configured to detect a rotational operation angle of the throttle lever, wherein:
    a drive source of the transport is configured to be controlled based on the rotational operation angle of the throttle lever detected by the detection sensor; and
    the throttle lever is configured to be rotated in a forward direction and a reverse direction relative to an initial position; and
    when the throttle lever is rotated in the forward direction, the drive source of the transport can be controlled.

2. The throttle operating device according to claim 1, further comprising:
    a shaft member which is connected to the throttle lever and rotates around an axis in response to a rotational operation of the throttle lever; and
    a magnet which is attached to the shaft member, wherein the detection sensor is attached at a position corresponding to the magnet, is configured to detect the rotational operation angle of the throttle lever based on a magnetic change of the magnet rotating in response to the throttle lever, and is configured to detect the rotational operation of the throttle lever in the forward direction and the reverse direction.

3. The throttle operating device according to claim 2, wherein
    a cover member covering an opening of the fixing member is provided and the detection sensor is attached to the cover member at a position corresponding to the magnet.

4. The throttle operating device according to claim 1, further comprising:
    a shaft member which is connected to the throttle lever and rotates around an axis in response to a rotational operation of the throttle lever;
    a rotating member which is connected to the shaft member and rotates in response to the rotational operation of the throttle lever; and
    a return spring which urges the throttle lever to the initial position when the throttle lever is rotated, wherein:
    a first locking portion configured to lock one end of the return spring and a second locking portion configured to lock the other end of the return spring are formed in the rotating member;
    when the throttle lever is rotated in the forward direction, the one end of the return spring is locked to the first locking portion and pivots in response to a rotation of the rotating member and the other end of the return spring is locked and fixed to the fixing member; and
    when the throttle lever is rotated in the reverse direction, the other end of the return spring is locked to the second locking portion and pivots in response to the rotation of the rotating member and the one end of the return spring is locked and fixed to the fixing member.

5. The throttle operating device according to claim 4, wherein:
    the fixing member has:
        a first fixing portion which locks and fixes the one end of the return spring when the throttle lever is rotated in the reverse direction;
        a second fixing portion which locks and fixes the other end of the return spring when the throttle lever is rotated in the forward direction; and
    a clearance is provided between the one end of the return spring and the first fixing portion, or between the other end of the return spring and the second fixing portion.

6. The throttle operating device according to claim 1, further comprising:
    a resistance force applying unit configured to generate friction during a rotational operation of the throttle lever in the forward direction and the reverse direction to apply a resistance force.

7. The throttle operating device according to claim 1, wherein
    an operating load of the throttle lever in the reverse direction is set to be larger than an operating load of the throttle lever in the forward direction.

8. The throttle operating device according to claim 7, further comprising:
    an operating load generating unit which generates a predetermined operating load when the throttle lever is rotated in the reverse direction and does not generate the operating load when the throttle lever is rotated in the forward direction.

9. The throttle operating device according to claim 8 further comprising:
    a shaft member which is connected to the throttle lever and rotates around an axis in response to the rotational operation of the throttle lever; and
    a rotating member which is connected to the shaft member and rotates in response to the rotational operation of the throttle lever, wherein the operating load generating unit is configured to rotate together with the rotating member and generate the operating load.

10. The throttle operating device according to claim 8, wherein the operating load generating unit includes:
- a displacement unit which is displaced in response to the rotational operation of the throttle lever in the reverse direction; and
- an urging unit which generates an urging force in response to a displacement of the displacement unit.

11. The throttle operating device according to claim 8, further comprising:

a return spring which urges the throttle lever to the initial position when the throttle lever is rotated in the forward direction and the reverse direction, wherein an urging force due to the return spring and the operating load due to the operating load generating unit are generated when the throttle lever is rotated in the reverse direction.

12. The throttle operating device according to claim 1, further comprising:

- a shaft member which is connected to the throttle lever and rotates around an axis in response to a rotational operation of the throttle lever;
- a return spring which is attached to the shaft member and urges the throttle lever to the initial position when the throttle lever is rotated; and
- an operating portion which is located between one end and the other end of the return spring and is configured to rotate in response to the rotational operation of the throttle lever, wherein:
  - when the throttle lever is rotated in the forward direction, the one end of the return spring is pressed and pivoted by the operating portion while the other end of the return spring is fixed to obtain an urging force; and
  - when the throttle lever is rotated in the reverse direction, the other end of the return spring is pressed and pivoted by the operating portion while the one end of the return spring is fixed to obtain an urging force.

13. The throttle operating device according to claim 12, further comprising:

- a first cover part which covers one end side of the return spring; and
- a second cover part which covers the other end side of the return spring, wherein the operating portion is configured to be pivoted by pressing the first cover part or the second cover part according to the rotational operation of the throttle lever.

14. The throttle operating device according to claim 13, wherein:

the operating portion has:
- a first pressing surface which presses the first cover part; and
- a second pressing surface which presses the second cover part; and at least one of the first pressing surface and the second pressing surface includes an edge surface of a notch formed in the operating portion.

15. The throttle operating device according to claim 1, further comprising:

- a shaft member which is connected to the throttle lever and rotates around an axis in response to a rotational operation of the throttle lever;
- a return spring for forward rotation which is attached to the shaft member and urges the throttle lever to the initial position when the throttle lever rotates in the forward direction; and
- a return spring for reverse rotation which is attached to the shaft member and urges the throttle lever to the initial position when the throttle lever rotates in the reverse direction.

16. The throttle operating device according to claim 15, wherein:

the detection sensor is configured to detect the rotational operation angle of the throttle lever in the forward direction and the reverse direction by detecting a change in a magnetic force of a magnet attached to the shaft member; and the return spring for forward rotation and the return spring for reverse rotation are respectively disposed at positions sandwiching the magnet.

17. The throttle operating device according to claim 15, further comprising:

a neutral position holding unit which holds the shaft member in a neutral position.

* * * * *

UNITED STATES PATENT AND TRADEMARK OFFICE
CERTIFICATE OF CORRECTION

PATENT NO. : 11,668,254 B2
APPLICATION NO. : 17/541402
DATED : June 6, 2023
INVENTOR(S) : Yukio Oshiro et al.

It is certified that error appears in the above-identified patent and that said Letters Patent is hereby corrected as shown below:

In the Specification

Column 9 Line 39, "fixing portion if which" should be -- fixing portion 1f which --.

Signed and Sealed this
Nineteenth Day of March, 2024

Katherine Kelly Vidal
*Director of the United States Patent and Trademark Office*